US008108637B2

(12) United States Patent
Arifin

(10) Patent No.: US 8,108,637 B2
(45) Date of Patent: Jan. 31, 2012

(54) INFORMATION PROCESSING SYSTEM, CONTROLLING METHOD IN INFORMATION PROCESSING SYSTEM, AND MANAGING APPARATUS TO MANAGE REMOTE COPY IN CONSIDERATION OF SAVING POWER

(75) Inventor: Ahmad Azamuddin Bin Mohd Zainal Arifin, Johor (MY)

(73) Assignee: Hitachi, Ltd., Tokyo (JP)

( * ) Notice: Subject to any disclaimer, the term of this patent is extended or adjusted under 35 U.S.C. 154(b) by 559 days.

(21) Appl. No.: 12/357,807

(22) Filed: Jan. 22, 2009

(65) Prior Publication Data
US 2010/0138621 A1 Jun. 3, 2010

(30) Foreign Application Priority Data
Nov. 28, 2008 (JP) ................................. 2008-304390

(51) Int. Cl.
*G06F 12/00* (2006.01)
*G06F 13/00* (2006.01)
*G06F 13/28* (2006.01)

(52) U.S. Cl. ................. 711/162; 711/161; 711/E12.103
(58) Field of Classification Search .................. None
See application file for complete search history.

(56) References Cited

U.S. PATENT DOCUMENTS

| 5,742,792 | A  | * | 4/1998  | Yanai et al. ................... 711/162 |
| 7,103,717 | B2 | * | 9/2006  | Abe et al. ....................... 711/114 |
| 7,269,690 | B2 | * | 9/2007  | Abe et al. ....................... 711/114 |
| 7,360,019 | B2 | * | 4/2008  | Abe et al. ....................... 711/114 |
| 7,469,315 | B2 | * | 12/2008 | Watanabe et al. ............. 711/114 |
| 7,685,378 | B2 |   | 3/2010  | Arakawa et al. |
| 7,849,280 | B2 | * | 12/2010 | Mizuno et al. ................ 711/162 |
| 2005/0228941 | A1 | * | 10/2005 | Abe et al. ....................... 711/113 |
| 2006/0095656 | A1 |   | 5/2006  | Ueoka et al. |
| 2006/0259684 | A1 | * | 11/2006 | Abe et al. ....................... 711/113 |
| 2007/0079088 | A1 | * | 4/2007  | Deguchi et al. ............... 711/162 |
| 2007/0143542 | A1 | * | 6/2007  | Watanabe et al. ............. 711/114 |
| 2007/0233950 | A1 | * | 10/2007 | Innan et al. .................... 711/114 |
| 2007/0245080 | A1 | * | 10/2007 | Abe et al. ....................... 711/113 |

(Continued)

FOREIGN PATENT DOCUMENTS

| JP | A-2006-079386 | 3/2006  |
| JP | 2007-102579   | 4/2007  |
| JP | A-2007-164650 | 6/2007  |
| JP | A-2008-198184 | 8/2008  |
| JP | A-2008-269441 | 11/2008 |
| JP | A-2008-287459 | 11/2008 |

OTHER PUBLICATIONS

Japanese Office Action in Japanese Application No. 2008-304390 mailed Dec. 30, 2010 with brief English translation.

*Primary Examiner* — Pierre-Michel Bataille
*Assistant Examiner* — Matthew Chrzanowski
(74) *Attorney, Agent, or Firm* — Brundidge & Stanger, P.C.

(57) ABSTRACT

A problem is to support to realize the efficient power saving according to the status of a remote copy in an information processing system provided with a storage apparatus. When newly using any one of volumes of a first storage apparatus and a second storage apparatus, a management apparatus of the present invention extracts a candidate volume to screen-display the extracted volume so that the volumes, whose power control characteristics are the same or similar, are collected in the same array group.

12 Claims, 28 Drawing Sheets

U.S. PATENT DOCUMENTS

| | | |
|---|---|---|
| 2008/0270696 A1 | 10/2008 | Murayama et al. |
| 2008/0288795 A1* | 11/2008 | Maruyama et al. ........... 713/320 |
| 2009/0019246 A1* | 1/2009 | Murase ........................ 711/162 |
| 2009/0063883 A1* | 3/2009 | Mori ............................. 713/324 |
| 2009/0135700 A1* | 5/2009 | Fujibayashi .................... 369/85 |
| 2011/0213994 A1* | 9/2011 | Thereska et al. .............. 713/320 |

* cited by examiner

FIG. 6

| # | COPY TYPE | COPY PAIR CONDITION | PRIMARY SIDE | | SECONDARY SIDE | |
|---|---|---|---|---|---|---|
| | | | VOLUME | JOURNAL | VOLUME | JOURNAL |
| 1 | RCS | PAIR | ON | — | ON | — |
| 2 | | PSUS | ON | — | OFF | — |
| 3 | RCA | PAIR | ON | — | ON/OFF | — |
| 4 | | PSUS | ON | — | OFF | — |
| 5 | RCD | PAIR | ON | ON | ON/OFF | ON/OFF |
| 6 | | PSUS | ON | ON | OFF | OFF |

FIG. 7

501 VOLUME INFORMATION TABLE

| # | SubsystemID | LDEVID | ArrayGroupID | Capacity |
|---|---|---|---|---|
| 1 | Subsystem01 | LDEV001 | Array01 | 20 |
| 2 | Subsystem01 | LDEV002 | Array01 | 20 |
| 3 | Subsystem01 | LDEV003 | Array01 | 20 |
| 4 | Subsystem01 | LDEV004 | Array02 | 20 |
| 5 | Subsystem01 | LDEV005 | Array02 | 20 |
| 6 | Subsystem01 | LDEV006 | Array02 | 20 |
| 7 | Subsystem01 | LDEV007 | Array03 | 20 |
| 8 | Subsystem01 | LDEV008 | Array03 | 20 |
| 9 | Subsystem01 | LDEV009 | Array03 | 20 |
| 10 | Subsystem01 | LDEV010 | Array04 | 20 |
| 11 | Subsystem01 | LDEV011 | Array04 | 20 |
| 12 | Subsystem01 | LDEV012 | Array04 | 20 |
| 13 | Subsystem02 | LDEV001 | Array01 | 20 |
| 14 | Subsystem02 | LDEV002 | Array01 | 20 |
| 15 | Subsystem02 | LDEV003 | Array01 | 20 |
| 16 | Subsystem02 | LDEV004 | Array02 | 20 |
| 17 | Subsystem02 | LDEV005 | Array02 | 20 |
| 18 | Subsystem02 | LDEV006 | Array02 | 20 |
| 19 | Subsystem02 | LDEV007 | Array03 | 20 |
| 20 | Subsystem02 | LDEV008 | Array03 | 20 |
| 21 | Subsystem02 | LDEV009 | Array03 | 20 |
| 22 | Subsystem02 | LDEV010 | Array04 | 20 |
| 23 | Subsystem02 | LDEV011 | Array04 | 20 |
| 24 | Subsystem02 | LDEV012 | Array04 | 20 |

FIG. 8

502 COMMAND DEVICE INFORMATION TABLE

| # | CmdDevID | SubsystemID | LDEVID |
|---|---|---|---|
| 1 | Cmd001 | Subsystem01 | LDEV003 |
| 2 | Cmd002 | Subsystem02 | LDEV012 |

FIG. 9

503 JOURNAL INFORMATION TABLE

| # | JnlID | SubsystemID | LDEVID | RemoteSubsystemID | PairJnlID |
|---|---|---|---|---|---|
| 1 | Jnl001 | Subsystem01 | LDEV012 | Subsystem02 | Jnl003 |
| 2 | Jnl002 | Subsystem02 | LDEV003 | Subsystem01 | Jnl001 |

FIG. 10

504 COPY GROUP INFORMATION TABLE

| # | GroupID | CopyType | JnlID_P | JnlID_S |
|---|---|---|---|---|
| 1 | Group001 | RCS | null | null |
| 2 | Group002 | RCA | null | null |
| 3 | Group003 | RCD | Jnl001 | Jnl002 |

FIG. 11

505 PAIR INFORMATION TABLE

| # | PairID | GroupID | PairStatus | SubsystemID | LDEVID_P | SubsystemID | LDEVID_S |
|---|--------|---------|------------|-------------|----------|-------------|----------|
| 1 | Pair001 | Group001 | PAIR | Subsystem01 | LDEV004 | Subsystem02 | LDEV007 |
| 2 | Pair002 | Group002 | PSUS | Subsystem01 | LDEV008 | Subsystem02 | LDEV005 |
| 3 | Pair003 | Group003 | COPY | Subsystem01 | LDEV009 | Subsystem02 | LDEV006 |

FIG. 12

506  COPY GROUP PERFORMANCE INFORMATION TABLE

| # | GroupID | JnlUsage_P | JnlUsage_S | SideFileUsage_P | SideFileUsage_S |
|---|---------|------------|------------|-----------------|-----------------|
| 1 | Group001 | null | null | null | null |
| 2 | Group002 | null | null | 0 | 0 |
| 3 | Group003 | 10 | 25 | null | null |

FIG. 13

507  COPY GROUP MONITORING INFORMATION TABLE

| # | GroupID | Monitor Setting | JnlUsage Monitor_P | JnlUsage Monitor_S | SideFileUsage Monitor_P | SideFileUsage Monitor_S |
|---|---------|-----------------|--------------------|--------------------|--------------------------|--------------------------|
| 1 | Group001 | On | null | null | null | null |
| 2 | Group002 | On | null | null | 0 | 25 |
| 3 | Group003 | On | 0 | 50 | null | null |

INITIAL STATUS

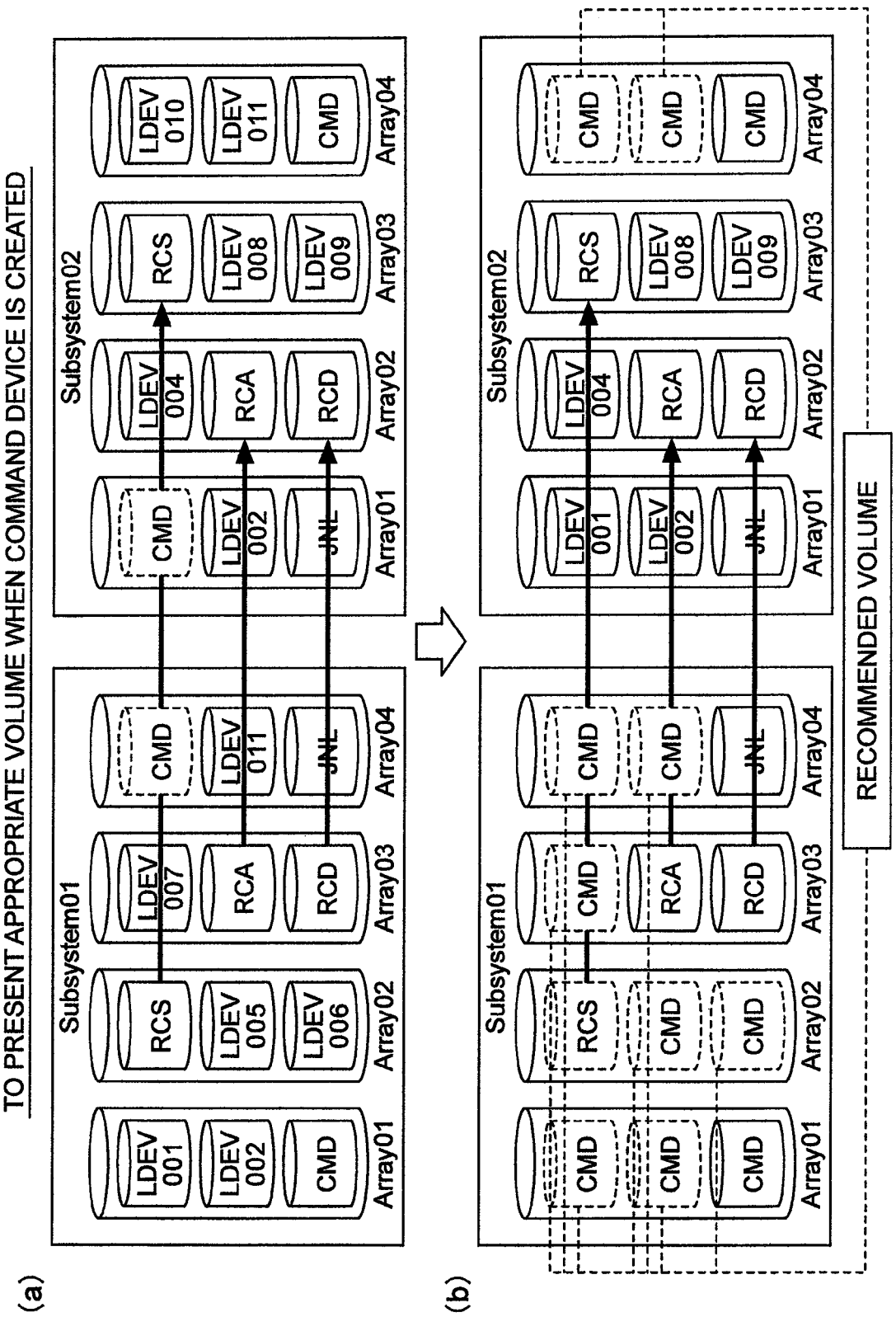

FIG. 16

5011 VOLUME INFORMATION TABLE
(PRIMARY SIDE)

| # | SubsystemID | LDEVID | ArrayGroupID | Capacity | PairID | CopyType | JnlID | CmdDevID |
|---|---|---|---|---|---|---|---|---|
| 1 | Subsystem01 | LDEV001 | Array01 | 20 | null | null | null | null |
| 2 | Subsystem01 | LDEV002 | Array01 | 20 | null | null | null | null |
| 3 | Subsystem01 | LDEV003 | Array01 | 20 | null | null | null | Dmd001 |
| 4 | Subsystem01 | LDEV004 | Array02 | 20 | Pair001 | RCS | null | null |
| 5 | Subsystem01 | LDEV005 | Array02 | 20 | null | null | null | null |
| 6 | Subsystem01 | LDEV006 | Array02 | 20 | null | null | null | null |
| 7 | Subsystem01 | LDEV007 | Array03 | 20 | null | null | null | null |
| 8 | Subsystem01 | LDEV008 | Array03 | 20 | Pair002 | RCA | null | null |
| 9 | Subsystem01 | LDEV009 | Array03 | 20 | Pair003 | RCD | null | null |
| 10 | Subsystem01 | LDEV010 | Array04 | 20 | null | null | null | null |
| 11 | Subsystem01 | LDEV011 | Array04 | 20 | null | null | null | null |
| 12 | Subsystem01 | LDEV012 | Array04 | 20 | null | null | Jnl001 | null |

FIG. 17

5012 VOLUME INFORMATION TABLE (SECONDARY SIDE)

| # | SubsystemID | LDEVID | ArrayGroupID | Capacity | PairID | CopyType | JnlID | CmdDevID |
|---|---|---|---|---|---|---|---|---|
| 1 | Subsystem02 | LDEV001 | Array01 | 20 | null | null | null | null |
| 2 | Subsystem02 | LDEV002 | Array01 | 20 | null | null | null | null |
| 3 | Subsystem02 | LDEV003 | Array01 | 20 | null | null | Jnl002 | null |
| 4 | Subsystem02 | LDEV004 | Array02 | 20 | null | null | null | null |
| 5 | Subsystem02 | LDEV005 | Array02 | 20 | Pair002 | RCA | null | null |
| 6 | Subsystem02 | LDEV006 | Array02 | 20 | Pair003 | RCD | null | null |
| 7 | Subsystem02 | LDEV007 | Array03 | 20 | Pair001 | RCS | null | null |
| 8 | Subsystem02 | LDEV008 | Array03 | 20 | null | null | null | null |
| 9 | Subsystem02 | LDEV009 | Array03 | 20 | null | null | null | null |
| 10 | Subsystem02 | LDEV010 | Array04 | 20 | null | null | null | null |
| 11 | Subsystem02 | LDEV011 | Array04 | 20 | null | null | null | null |
| 12 | Subsystem02 | LDEV012 | Array04 | 20 | null | null | null | Cmd002 |

FIG. 18

| # | SubsystemID | LDEVID | Capacity | CONDITION 1 |
|---|---|---|---|---|
| 1 | Subsystem01 | LDEV001 | 20 | ○ |
| 2 | Subsystem01 | LDEV002 | 20 | ○ |
| 3 | Subsystem01 | LDEV005 | 20 | ○ |
| 4 | Subsystem01 | LDEV006 | 20 | ○ |
| 5 | Subsystem01 | LDEV007 | 20 | ○ |
| 6 | Subsystem01 | LDEV010 | 20 | ○ |
| 7 | Subsystem01 | LDEV011 | 20 | ○ |

FIG. 19

| # | SubsystemID | LDEVID | Capacity | CONDITION 1 |
|---|---|---|---|---|
| 1 | Subsystem02 | LDEV001 | 20 | × |
| 2 | Subsystem02 | LDEV002 | 20 | × |
| 3 | Subsystem02 | LDEV004 | 20 | × |
| 4 | Subsystem02 | LDEV008 | 20 | × |
| 5 | Subsystem02 | LDEV009 | 20 | × |
| 6 | Subsystem02 | LDEV010 | 20 | ○ |
| 7 | Subsystem02 | LDEV011 | 20 | ○ |

FIG. 22
TO PRESENT APPROPRIATE VOLUME WHEN JOURNAL IS CREATED
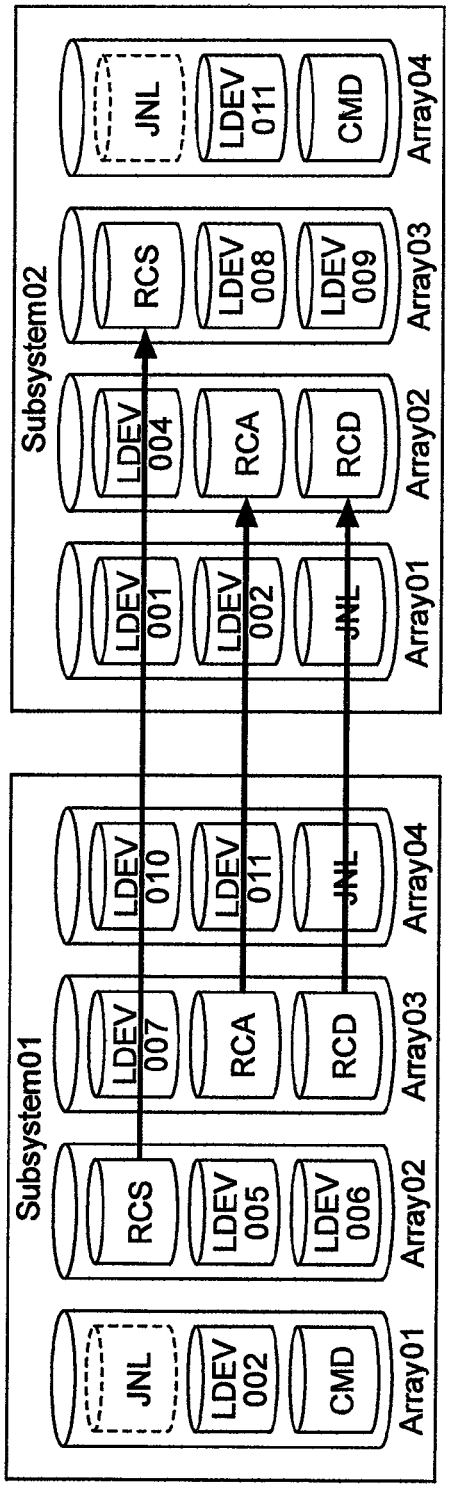
(a)
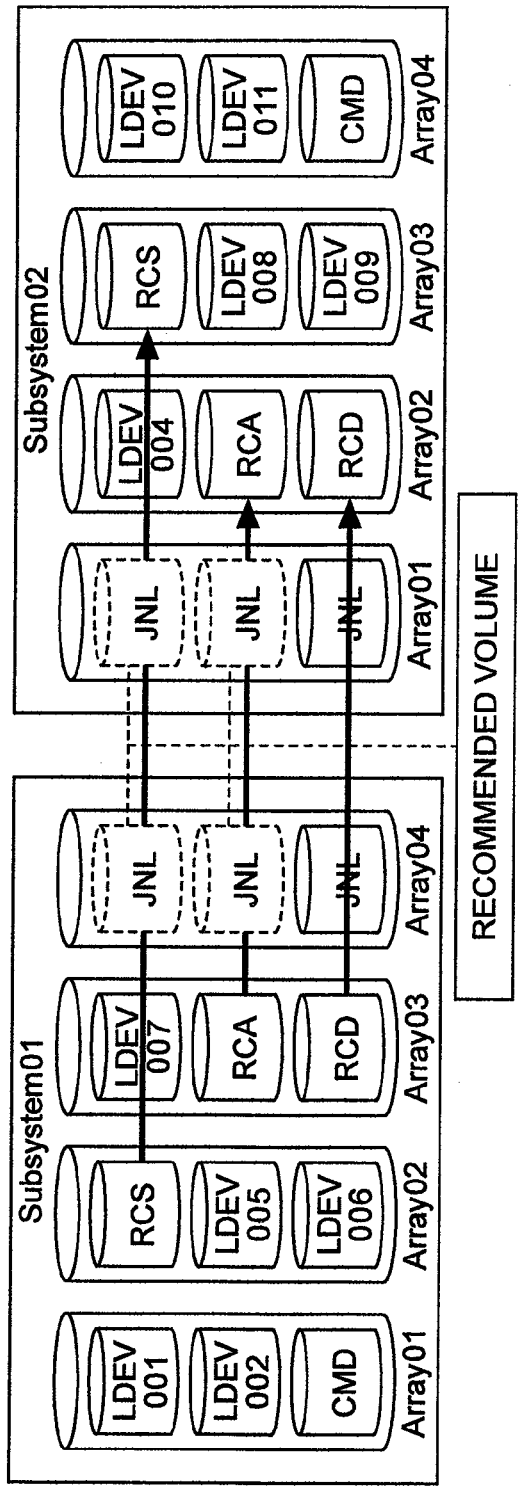
(b)

FIG. 23

| # | SubsystemID | LDEVID | Capacity | CONDITION 3 | CONDITION 4 |
|---|---|---|---|---|---|
| 1 | Subsystem01 | LDEV001 | 20 | × | × |
| 2 | Subsystem01 | LDEV002 | 20 | × | × |
| 3 | Subsystem01 | LDEV005 | 20 | × | × |
| 4 | Subsystem01 | LDEV006 | 20 | × | × |
| 5 | Subsystem01 | LDEV007 | 20 | × | × |
| 6 | Subsystem01 | LDEV010 | 20 | ○ | ○ |
| 7 | Subsystem01 | LDEV011 | 20 | ○ | ○ |

FIG. 24

| # | SubsystemID | LDEVID | Capacity | CONDITION 3 | CONDITION 4 |
|---|---|---|---|---|---|
| 1 | Subsystem02 | LDEV001 | 20 | ○ | ○ |
| 2 | Subsystem02 | LDEV002 | 20 | ○ | ○ |
| 3 | Subsystem02 | LDEV004 | 20 | × | × |
| 4 | Subsystem02 | LDEV008 | 20 | × | × |
| 5 | Subsystem02 | LDEV009 | 20 | × | × |
| 6 | Subsystem02 | LDEV010 | 20 | × | × |
| 7 | Subsystem02 | LDEV011 | 20 | × | × |

FIG. 26
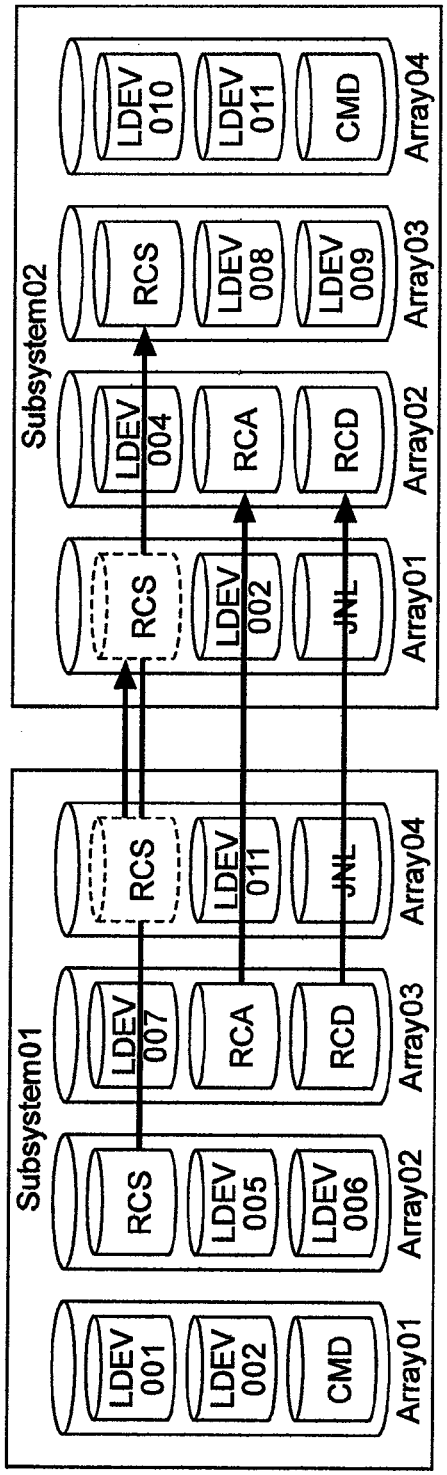
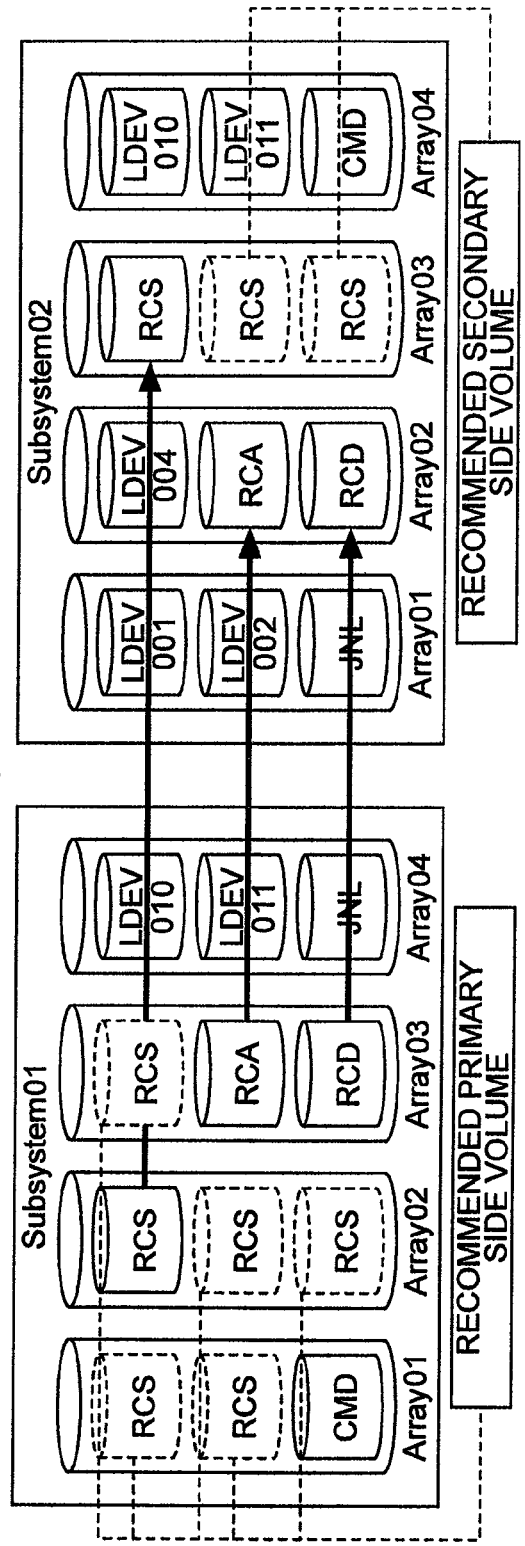

FIG. 28

| # | SubsystemID | LDEVID | Capacity | CONDITION 5 | CONDITION 6 |
|---|---|---|---|---|---|
| 1 | Subsystem01 | LDEV001 | 20 | ○ | ○ |
| 2 | Subsystem01 | LDEV002 | 20 | ○ | ○ |
| 3 | Subsystem01 | LDEV005 | 20 | ○ | ○ |
| 4 | Subsystem01 | LDEV006 | 20 | ○ | ○ |
| 5 | Subsystem01 | LDEV007 | 20 | ○ | ○ |
| 6 | Subsystem01 | LDEV010 | 20 | × | × |
| 7 | Subsystem01 | LDEV011 | 20 | × | × |

FIG. 29

| # | SubsystemID | LDEVID | Capacity | CONDITION 7 | CONDITION 8 |
|---|---|---|---|---|---|
| 1 | Subsystem02 | LDEV001 | 20 | × | × |
| 2 | Subsystem02 | LDEV002 | 20 | × | × |
| 4 | Subsystem02 | LDEV004 | 20 | × | × |
| 8 | Subsystem02 | LDEV008 | 20 | ○ | ○ |
| 9 | Subsystem02 | LDEV009 | 20 | ○ | ○ |
| 10 | Subsystem02 | LDEV010 | 20 | × | × |
| 11 | Subsystem02 | LDEV011 | 20 | × | × |

| # | SubsystemID | LDEVID | Capacity | CONDITION 9 | CONDITION 10 |
|---|---|---|---|---|---|
| 1 | Subsystem02 | LDEV001 | 20 | × | × |
| 2 | Subsystem02 | LDEV002 | 20 | × | × |
| 4 | Subsystem02 | LDEV004 | 20 | ○ | ○ |
| 8 | Subsystem02 | LDEV008 | 20 | × | × |
| 9 | Subsystem02 | LDEV009 | 20 | × | × |
| 10 | Subsystem02 | LDEV010 | 20 | × | × |
| 11 | Subsystem02 | LDEV011 | 20 | × | × |

5041 COPY GROUP INFORMATION GENERATED BY USER

| # | GroupID | CopyType | JnlID_P | JnlID_S |
|---|---|---|---|---|
| 1 | Group004 | RCS | null | null |
| 2 | Group005 | RCD | null | null |

FIG. 32

5053 COPY PAIR INFORMATION GENERATED BY USER

| # | PairID | GroupID | PairStatus | SubsystemID | LDEVID_P | SubsystemID | LDEVID_S |
|---|--------|---------|------------|-------------|----------|-------------|----------|
| 1 | Pair004 | Group004 | PAIR | Subsystem01 | LDEV005 | Subsystem02 | LDEV008 |
| 2 | Pair005 | Group005 | PSUS | Subsystem01 | LDEV007 | Subsystem02 | LDEV004 |

FIG. 33

5061 COPY GROUP PERFORMANCE INFORMATION GENERATED BY USER

| # | GroupID | JnlUsage_P | JnlUsage_S | SideFileUsage_P | SideFileUsage_S |
|---|---|---|---|---|---|
| 1 | Group004 | null | null | null | null |
| 2 | Group005 | null | null | 10 | 20 |

FIG. 34

5071 COPY GROUP MONITORING INFORMATION GENERATED BY USER

| # | GroupID | Monitor Setting | JnlUsage Monitor_P | JnlUsage Monitor_S | SideFileUsage Monitor_P | SideFileUsage Monitor_S |
|---|---|---|---|---|---|---|
| 1 | Group004 | On | null | null | null | null |
| 2 | Group005 | On | null | null | 0 | 25 |

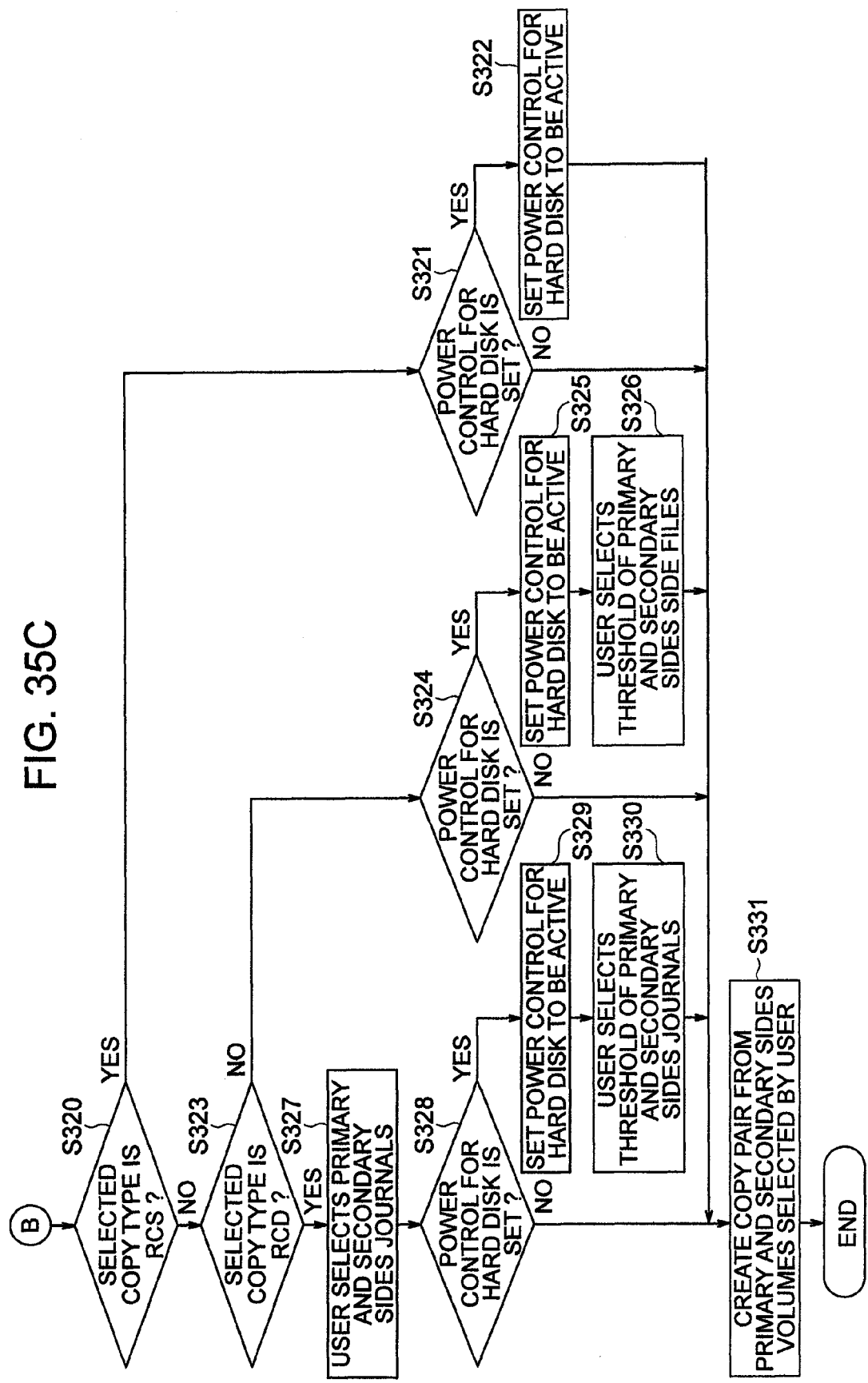

INFORMATION PROCESSING SYSTEM, CONTROLLING METHOD IN INFORMATION PROCESSING SYSTEM, AND MANAGING APPARATUS TO MANAGE REMOTE COPY IN CONSIDERATION OF SAVING POWER

INCORPORATION BY REFERENCE

The present application claims priority from Japanese application JP 2008-304390 filed on Nov. 28, 2008, the content of which is hereby incorporated by reference into this application.

BACKGROUND OF THE INVENTION

1. Field of the Invention

The present invention relates to a technique for reducing power consumption in an information processing system having a storage apparatus (large capacity storage apparatus).

2. Description of the Related Art

In recent years, such a need has been expanded that data is stored in a long term in a corporate information system. The background of such a need is that legal regulation requires transaction data, medical data, and the like to be stored in a long term in a field such as finance, medical care, and medicine manufacture.

When the data is stored in a long term, a storage apparatus provided with a number of HDD (Hard Disk Drive) is, for example, used as a storage medium. It is strongly requested from such a viewpoint of the global environment and the corporate management in the modern society to consider and realize the power saving (power reduction) when the storage apparatus is used.

For example, JP-A-2007-102579 discloses such a technique that saves the power of the HDD along with a copying process for an asynchronous remote copy as an object for reducing the power of the storage apparatus. Meanwhile, the remote copy is a technique for copying (replicating) the data stored in a storage area (copy source storage area) of the storage apparatus to the storage area (copy destination storage area) of another storage apparatus.

However, in the technique disclosed in JP-A-2007-102579, a manager storage administrator managing the storage apparatus can not easily manage the remote copy in consideration of the power saving.

The present invention has been made in consideration of the above problem, and in the information processing system provided with the storage apparatus, a problem is to easily manage the remote copy in consideration of the power saving.

SUMMARY OF THE INVENTION

The present invention relates to the information processing system including an information processing apparatus, a first storage apparatus which is coupled to the information processing apparatus, and is provided with a plurality of array groups including a plurality of volumes, a second storage apparatus, which is coupled to the first storage apparatus, and is provided with a plurality of the array groups including a plurality of the volumes, and a management apparatus for managing the remote copy executed from the volume of the first storage apparatus to the volume of the second storage apparatus.

When any volume is newly used for the remote copy in the first storage apparatus and the second storage apparatus, the management apparatus extracts a candidate volume and screen-displays the volume so that the volume is collected in the same array group, whose power control characteristics are the same or similar. Other means will be described later.

According to present invention, in the information processing system provided with the storage apparatus, it is possible to support the manager to manage the remote copy in consideration of the power saving.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram illustrating a relation of power status of a volume and a journal for each copy type and each copy pair status in a copy pair;

FIG. 7 is a diagram illustrating a configuration of a volume information table 501;

FIG. 8 is a diagram illustrating a command device information table 502;

FIG. 9 is a diagram illustrating a journal information table 503;

FIG. 10 is a diagram illustrating a copy group information table 504;

FIG. 11 is a diagram illustrating a pair information table 505;

FIG. 12 is a diagram illustrating a copy group performance information table 506;

FIG. 13 is a diagram illustrating a copy group monitoring information table 507;

FIG. 15 is a diagram for presenting a candidate volumes when a command device is generatedcreated, (a) is a diagram illustrating a case of a comparison example, and (b) is a diagram illustrating a case of the present embodiment;

FIG. 16 is a diagram illustrating a volume information table (primary side) 5011;

FIG. 17 is a diagram illustrating a volume information table (secondary side) 5012;

FIG. 18 is a diagram illustrating a determination result for a Subsystem01;

FIG. 19 is a diagram illustrating the determination result for a Subsystem02;

FIG. 22 is a diagram for presenting a recommended volume when a journal is generated, (a) is a diagram illustrating a case of the comparison example, and (b) is a diagram illustrating a case of the present embodiment;

FIG. 23 is a diagram illustrating the determination result for the Subsystem01;

FIG. 24 is a diagram illustrating the determination result for the Subsystem02;

FIG. 26 is a diagram for presenting the recommended volumes when a copy pair is generated in a synchronous remote copy, (a) is a diagram illustrating a case of the comparison example, and (b) is a diagram illustrating a case of the present embodiment;

FIG. 28 is a diagram illustrating the determination result for the Subsystem01;

FIG. 29 is a diagram illustrating the determination result for the Subsystem02 in the synchronous remote copy;

FIG. 32 illustrates copy pair information 5053 generated by the user;

FIG. 33 illustrates copy group performance information 5061 generated by the user;

FIG. 34 illustrates copy group monitoring information 5071 designated by the user;

FIG. 35C is a diagram illustrating a process of the function 3 by the management server 100.

DETAILED DESCRIPTION OF THE EMBODIMENTS

Figure 1:
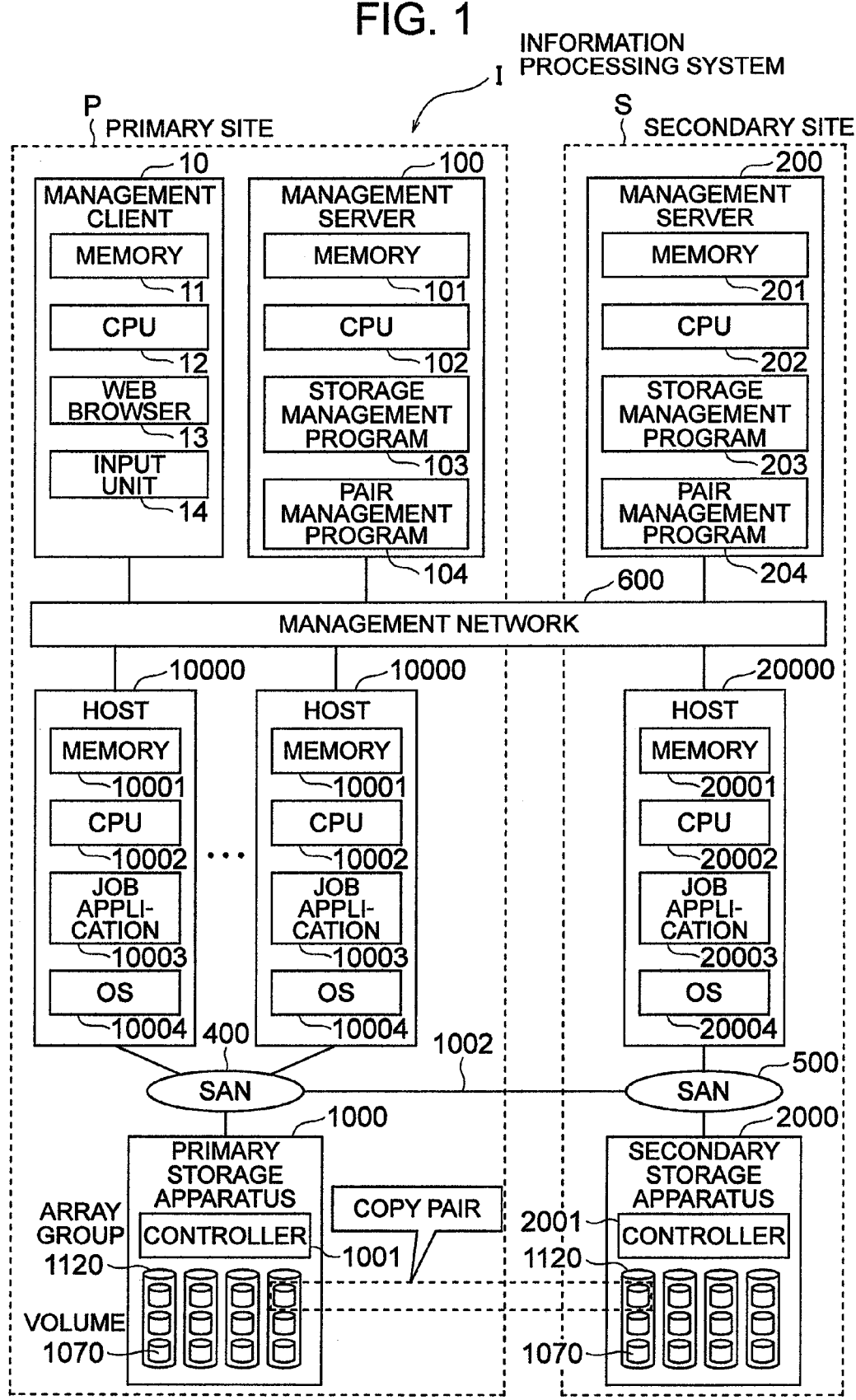
FIG. 1 is a diagram illustrating a total configuration of an information processing system according to the present embodiment.

The best aspect (hereinafter, referred to as embodiment) for implementing the present invention will be described below by referring to the views (also arbitrarily referring to the views other than the described views). FIG. 1 is a diagram illustrating a total configuration of an information processing system according to the present embodiment.

An information processing system I (hereinafter, also referred to as just "system") of the present embodiment is including a primary site P and a secondary site S. The primary site P is a main site. The secondary site S is used as a backup site.

The primary site P is provided with a management client 10, a management server 100 (management apparatus), one or more hosts 10000 (information processing apparatus), and a primary storage apparatus 1000 (a first storage apparatus). The management client 10, the management server 100, the one or more hosts 10000 are coupled to the storage apparatuses (both of the primary storage apparatus 1000 and a secondary storage apparatus 2000 are indicated. Hereinafter, the same indication) and a management network 600 which is a network used by a manager (a user) managing a copy pair. The one or more hosts 10000 and the primary storage apparatus 1000 are coupled by a SAN (Storage area Network) 400. Thereby, the host 10000 can issue a write request and a read request to the primary storage apparatus 1000.

Meanwhile, generally, in a site executing a large-scale job, a plurality of the storage apparatuses are operating, which includes several hundred to several thousand hosts (computers) and several tens of thousands of volumes. In such a large-scale environment, when the copy pair creation and copy pair status management is managed in a total system, and when a plurality of pair management servers are used, a operation cost for the pair management servers becomes huge. Further, since each pair management server can not have the information on such a fact that which host uses which volume, it becomes difficult to manage the copy in a large-scale configuration. To reduce this operation cost, one management server (this may be physically including a plurality of computer apparatuses) is used in the present embodiment. The management server 100 centrally manages the copy pair and a copy group.

The management client 10 is a computer apparatus used by the manager, and is provided with a memory 11 including a storing unit such as a RAM (Random Access Memory) and a ROM (Read Only Memory), a CPU (Central Processing Unit) 12 which is a calculation processing unit, a Web browser 13 which is a displaying unit, and an input unit 14 including a keyboard, a mouse, and the like.

The management server 100 is a server apparatus for collecting and managing copy pair information included in a system, and can execute an operation for creating and deleting the copy pair, and can monitor a status of the copy pair.

Here, the copy pair (hereinafter, also referred to as just "pair") means the two volumes which are a pair to generate the copy of the volume (a logical storage area for storing data managed by the storage apparatus). That is, the copy pair includes the two volumes of a primary side and a secondary side. Generally, the primary side volume is used for a job purpose, and the secondary side volume is used for backup. The copy pair includes the copy pair for a periodical backup purpose, and the copy pair for a disaster recovery purpose (to save data for the recovery when disaster occurred). Meanwhile, in the case of the periodical backup purpose, a local copy (the copy in the same storage apparatus) is generally used, and in the case of the disaster recovery purpose, a remote copy (the copy between the different storage apparatuses) is generally used.

Figure 5:
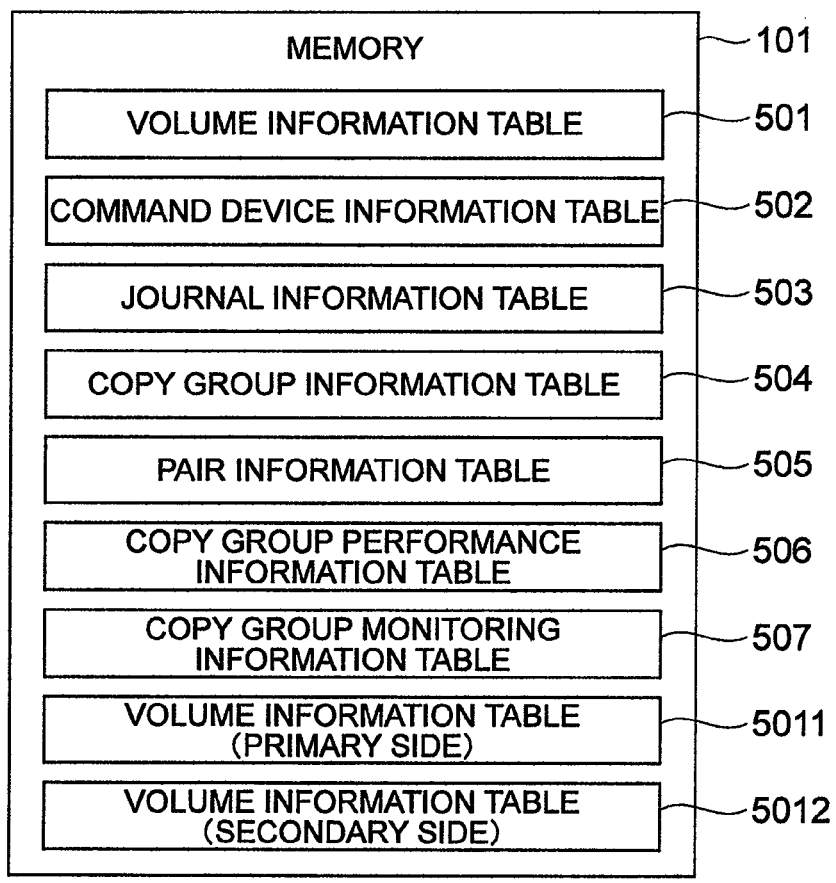
FIG. 5 is a diagram illustrating a configuration of a memory 101.

The management server 100 is provided with a memory 101 including the storing unit such as the RAM and the ROM, a CPU 102 which is the calculation processing unit, a storage management program 103 which is a program for managing the storage apparatus, and a pair management program 104 which is a program for managing (creating, deleting, status-monitoring, and the like) copy pair information included in the system. Here, FIG. 5 is a diagram illustrating a configuration of the memory 101. The memory 101 stores a volume information table 501, a command device information table 502, a journal information table 503, a copy group information table 504, a pair information table 505, a copy group performance information table 506, a copy group monitoring information table 507, a volume information table (primary side) 5011, and a volume information table (secondary side) 5012 (the detail will be described later).

The host 10000 is the computer apparatus for issuing the data write (writing) request and the data read (reading) request to the primary storage apparatus 1000, and is provided with a memory 10001 including the storing unit such as the RAM and the ROM, a CPU 10002 which is the calculation processing unit, a job application 10003 which is a job program, and an OS 10004 which is the basic software.

The primary storage apparatus 1000 is a large-capacity computer apparatus for storing data with the write request received from the host 10000, and is provided with a controller 1001, and an array group 1120 including a plurality of volumes 1070. The array group 1120 is a group of disks whose configuration is the same RAID (Redundant Arrays of Inexpensive Disks) configuration. Meanwhile, when the configuration of the group of disks is not the RAID configuration, each disk corresponds to each array group.

The secondary site S is provided with a management server 200, a host 20000, and a secondary storage apparatus 2000 (a second storage apparatus). The management server 200 and the host 20000 are coupled by the management network 600. The host 20000 and the secondary storage apparatus 2000 are coupled by a SAN 500. A SAN 400 and the SAN 500 are mutually coupled by a line 1002. Thereby, it is possible to copy data stored in the primary storage apparatus 1000 to the secondary storage apparatus 2000. Meanwhile, the line may be also including a plurality of lines to respond to the network fault, which is used in the management network 600, the SAN 400, and the SAN 500.

The management server 200 is provided with, like the management server 100, a memory 201 which is including the storing unit such as the RAM and the ROM, a CPU 202 which is the calculation processing unit, a storage management program 203 which is a program for managing the storage apparatus, and a pair management program 204 which is a program for managing (creating, deleting, status-monitoring, and the like) copy pair information included in the system.

The host 20000 is, like the host 10000, the computer apparatus for issuing the data write (writing) request and the data read (reading) request to the secondary storage apparatus 2000, and is provided with a memory 20001 including the storing unit such as the RAM and the ROM, a CPU 20002 which is the calculation processing unit, a job application 20003 which is the job program, and an OS 20004 which is the basic software.

The secondary storage apparatus 2000 is the large-capacity computer apparatus for storing, by the remote copy, the data reserved by the primary storage apparatus 1000, and is provided with a controller 2001, and the array group 1120 including a plurality of the volumes 1070.

Meanwhile, as illustrated in FIG. 1, the copy pair is formed by some volume of the primary storage apparatus 1000 and some volume of the secondary storage apparatus 2000.

In the above configuration, the present invention provides a setting function or a monitoring function for causing the remote copy to be easily managed, in consideration of the power saving.

Figure 4:
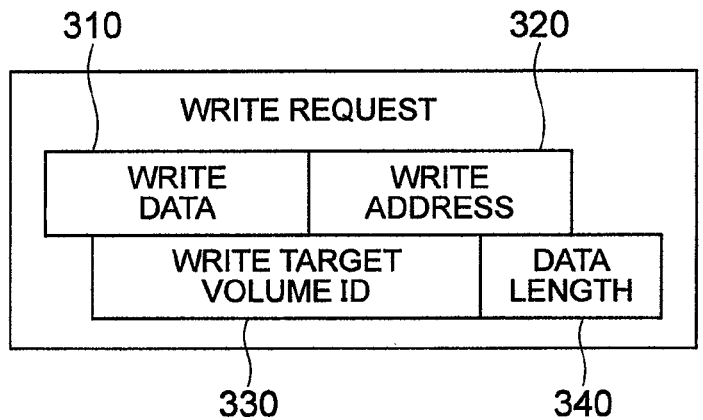
FIG. 4 is a diagram illustrating an example of a write request 300 issued from a host 10000 to the primary storage apparatus 1000.

FIG. 4 is a diagram illustrating an example of a write request 300 issued from the host 10000 to the primary storage apparatus 1000. The write request 300 issued from the host 10000 stores write data 310, a write target volume ID (Identification) 330 which is identification information on a write target volume, a write address 320 indicating a write location in the corresponding write target volume, and a data length 340 of the write data 310.

Figure 2:
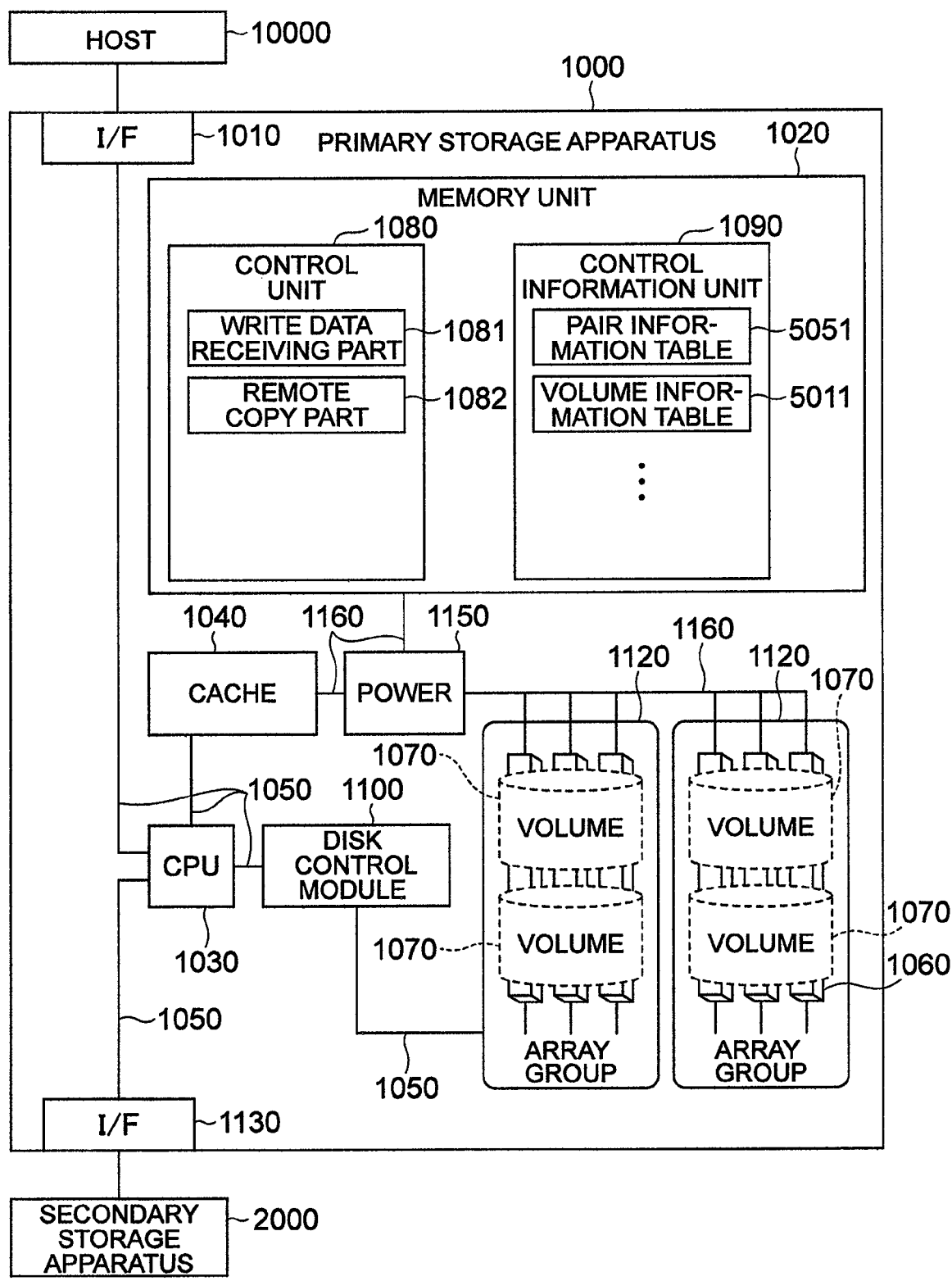
FIG. 2 is an explanatory diagram including an exemplary configuration of a primary storage apparatus 1000.
Figure 3:
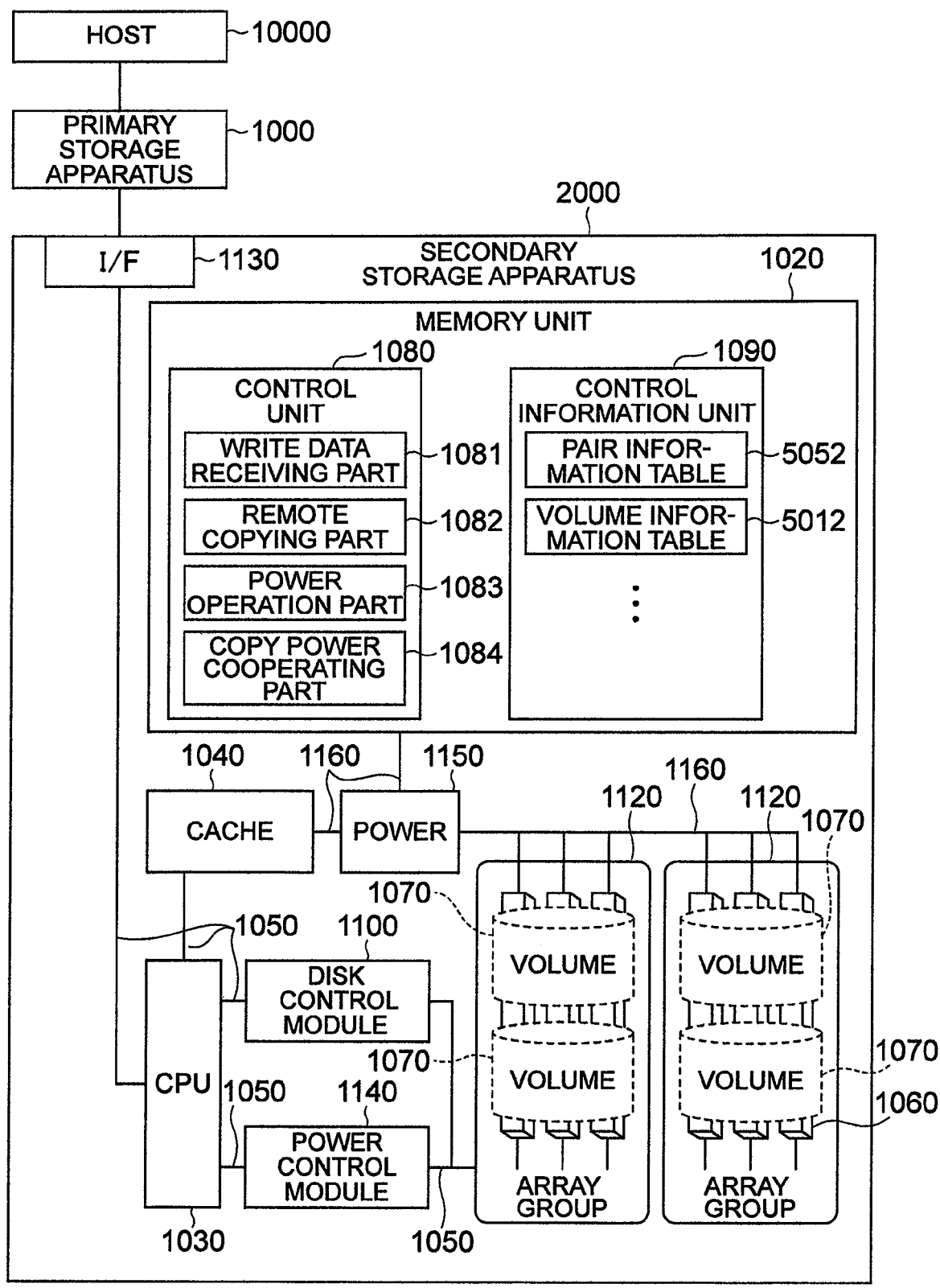
FIG. 3 is an explanatory diagram including an exemplary configuration of a secondary storage apparatus 2000.

FIG. 2 is an explanatory diagram including an example of a configuration of the primary storage apparatus 1000. FIG. 3 is an explanatory diagram including an example of a configuration of the secondary storage apparatus 2000. Since many of components/units are the same as to each other in the primary storage apparatus 1000 and the secondary storage apparatus 2000, the same components/units will be together described as the components/units of the primary storage apparatus 1000 and the secondary storage apparatus 2000. In the present embodiment, such a case will be considered that the remote copy is executed from the primary storage apparatus 1000 to the secondary storage apparatus 2000. That is, the primary storage apparatus 1000 includes a copy source volume of a remote copy pair, and the secondary storage apparatus 2000 includes a copy destination volume.

The primary storage apparatus 1000 and the secondary storage apparatus 2000 are roughly including a memory unit 1020, a CPU 1030, a cache 1040, one or more HDDs (Hard Disk Drive) 1060, a disk control module 1100, an I/F 1130, and a power 1150. An in-apparatus network 1050 is coupled to the CPU 1030, the I/F 1130, the cache 1040, the memory unit 1020, and the disk control module 1100. Further, the in-apparatus network 1050 is also coupled to the HDD 1060 and the disk control module 1100.

A power line 1160 is coupled to the power 1150 and the memory unit 1020, the cache 1040, and the HDD 1060. The power 1150 supplies the power to the memory unit 1020, the cache 1040, and the HDD 1060 through the power line 1160.

Since the cache 1040 stores data which is used frequently, stored in the HDD 1060, and the like, the cache 1040 is utilized to speed up the process such as the read and the write from the host 10000 as compared with such a case that every data is stored in the HDD 1060. The I/F 1130 is an interface for transmitting and receiving data and a control message between the primary storage apparatus 1000 and the secondary storage apparatus 2000. The primary storage apparatus 1000 and the secondary storage apparatus 2000 may include a plurality of the I/Fs 1130.

The HDD 1060 stores data utilized by software executed by the host 10000. Every HDD 1060 is coupled to the disk control module 1100. An array group 1120, which is obtained by collecting one or more HDDs 1060, is designated to be a RAID (Redundant Arrays of Inexpensive Disks) configuration. The array group 1120 including one or more HDDs 1060 is divided to one or more logical storage area, each logical storage area is treated as a logical storage device, and this logical storage device is referred to as a volume 1070.

Next, a unique component in the primary storage apparatus 1000, each unit included in the memory unit 1020, and control information will be described. In addition to the common components between the primary storage apparatus 1000 and the secondary storage apparatus 2000, the primary storage apparatus 1000 includes an I/F 1010. The I/F 1010 is coupled to the CPU 1030 via the in-apparatus network 1050. The I/F 1010 is an interface for receiving an I/O request, such as the write request and the read request, issued from the host 10000 to the primary storage apparatus 1000. The primary storage apparatus 1000 may include a plurality of the I/Fs 1010.

The memory unit 1020 is roughly including a control unit 1080 and a control information unit 1090. The control unit 1080 of the primary storage apparatus 1000 includes a write data receiving part 1081 for receiving the write request 300 from the host 10000, and processing the received write request 300, and a remote copying part 1082 for executing the remote copy. Meanwhile, each unit included in the control unit 1080 is a program stored in the memory unit 1020, and is executed by the CPU 1030 of the primary storage apparatus 1000. However, a part or all of such programs may be executed by hardware.

The control information unit 1090 of the primary storage apparatus 1000 saves a part of a variety of pieces of the copy pair information, the volume, the array group, and the like which are saved by the management server 100. Here, as the part of the information, the following tables are illustrated: a pair information table 5051 (the same table as the pair information table 505 described later); and a volume information table (primary side) 5011 (the same table as the volume information table 501 described later).

Next, a unique component in the secondary storage apparatus 2000, each unit included in the memory unit 1020, and the control information will be described. In addition to the above common components between the primary storage apparatus 1000 and the secondary storage apparatus 2000, the secondary storage apparatus 2000 includes a power control module 1140. The power control module 1140 is coupled by the in-apparatus network 1050 to the control unit 1080 and the HDD 1060. The power control module 1140 is a module for switching on/off of the power of the HDD 1060 according to an instruction from a power operation part 1083 described later.

Meanwhile, in the present embodiment, such an operation that all the HDDs 1060 are powered on which belong to some array group 1120 is expressed as just "the array group 1120 is started". Further, such an operation that all the HDDs 1060 are powered off which belong to some array group 1120 is expressed as just "the array group 1120 is stopped". Further, "the HDD 1060 is powered off" means such an operation that the HDD 1060 moves to an operation status for suppressing the power consumption, and for example, the following operations are considered: a rotation of a platter is stopped in the HDD 1060; the power consumption of a controller inside the HDD 1060 is reduced; and the power supply to the HDD 1060 is actually stopped. "The HDD 1060 is powered on" means such an operation that an operation status of the HDD 1060 is returned from such a status that the power consumption is suppressed to such a status that the write/read request can be normally processed.

The memory unit 1020 is roughly including the control unit 1080 and the control information unit 1090. The control unit 1080 of the secondary storage apparatus 2000 includes the write data receiving part 1081 and the remote copying part 1082, and such units are the same as each unit included in the primary storage apparatus 1000. The control unit 1080 of the secondary storage apparatus 2000 further includes a power operation part 1083 and a copy power cooperating part 1084.

The control information unit 1090 of the secondary storage apparatus 2000 saves a part of a variety of pieces of the copy pair information, the volume, the array group, and the like which are saved by the management server 100. Here, as the part of the information, the following tables are illustrated: a pair information table 5052 (the same table as the pair information table 505 described later); and a volume information table (primary/secondary) 5012 (the same table as the volume information table 501 described later).

A data copy method for remote copy includes a synchronous method (RCS (Remote Copy Synchronous)) and an asynchronous method. The asynchronous data copy method includes a method (RCA (Remote Copy Asynchronous)) for storing changed data history in a memory, and a method (RCD (Remote Copy asynchronous with Disk: asynchronous remote copy by utilizing the disk)) for storing the changed data history in both of the memory and the volume.

Here, terms used in the following description will be described. "CMD" is a command device volume (the volume for issuing an instruction to the storage apparatus). "Primary (secondary) RCS" is the primary (secondary) side volume of a RCS copy pair. "Primary (secondary) RCA" is the primary (secondary) side volume of a RCA copy pair. "Primary (secondary) RCD" is the primary (secondary) side volume of a RCD copy pair. "Primary (secondary) JNL (journal)" is a primary (secondary) side journal volume (the volume for temporarily storing data of the asynchronous remote copy (RCD) before copying the data to the secondary volume. "Side File" is a table for maintaining correct data update order in a consistency group (a group which is including a plurality of the copy pairs, and in which the consistency of data time sequence is maintained) of the asynchronous remote copy (RCA) in a cache memory.

The above three types of data copying method will be described again.

In the synchronous (RCS), data is copied from "primary RCS" to "secondary RCS".

In the asynchronous (RCA), first, data is copied from "primary RCA" to "primary side file", after that, the asynchronous copy is executed from the "primary side file" to "secondary side file", and finally, the data is copied from the "secondary side file" to "secondary RCA".

In the asynchronous (RCD), first, data is copied from "primary RCD" to "primary journal", after that, the asynchronous copy is executed from the "primary journal" to "secondary journal", and finally, the data is copied from the "secondary journal" to "secondary RCD". Meanwhile, in the case of the "RCD", the write data may be also stored in both of the primary journal and the memory.

FIG. 6 is a diagram illustrating a relation of power status of the volume and the journal for each copy type and each copy pair status in the copy pair. As an assumption, since it is necessary to constantly start the command device volume while a job is running in any of the primary and secondary side of storage apparatuses, the disk can not be powered off.

In the case of the RCS copy pair, while it is necessary to operate both of the primary and secondary volumes in PAIR (pair status), data is not written for the secondary side volume in PSUS (suspend status), so that the disk can be powered off.

The RCA copy pair is the asynchronous remote copy, and the data written in the primary side volume is not immediately copied to the secondary volume. That is, the data written in the primary side volume is temporarily copied to the secondary side volume after being temporarily stored in the side file. Thus, in the case of the PAIR, it is possible to separate the uses of the power on/off according to a usage rate of the secondary side file. In the case of the PSUS, the secondary side volume can be powered off in a similar way to the case of the RCS.

The RCD copy pair is the asynchronous remote copy, and the data written in the primary side volume is not immediately copied to the secondary volume. That is, the data written in the primary side volume is copied to the secondary side journal after being temporarily stored in the primary side journal. After that, the data is copied from the secondary side journal to the secondary side volume. Thus, in the case of the PAIR, it is possible to separate the uses of the power on/off for the secondary side volume according to the usage rate of the secondary side journal. It is possible to separate the uses of the power on/off for the secondary side journal according to the usage rate of the primary side journal. That is, it is possible to power off both of the secondary side volume and the secondary side journal, and also, to power off only any one of the secondary side volume and the secondary side journal. In the case of the PSUS, it is possible to power off the secondary side volume and the secondary side journal.

The present embodiment proposes a function for efficiently realizing the power off under the environment of the remote copy by utilizing such characteristics of the remote copy. To realize such a function, the volume, which needs to constantly operate, and the volume, which does not need to constantly operate, are separated to specific array groups when the copy is created, or when the command device is created. Therefore, it is possible to realize a function for efficiently power off each array group.

To realize the above, the present embodiment proposes the following three functions. Function 1: to present recommended volumes to the manager storage administrator for creating command device. Function 2: to present the recommended volumes to the manager for creating journal. Function 3: to present the recommended volumes to the manager for creating copy pair.

Meanwhile, the volume information table 501 to the copy group monitoring information table 507 are commonly used to realize such three functions.

FIG. 7 is a diagram illustrating a configuration of the volume information table 501. SubsystemID is an ID for uniquely determining a subsystem (an aggregate of a predetermined number of array groups) of the primary storage apparatus 1000 of the primary site P. LDEVID is an ID for uniquely determining the volume in the storage apparatus. ArrayGroupID is an ID for uniquely determining the array group. Capacity indicates a capacity of the volume.

FIG. 8 is a diagram illustrating the command device information table 502. CmdDevID is an ID for uniquely determining the volume in the storage apparatus, which is used as the command device. Meanwhile, SubsystemID and LDEVID are the same as those of FIG. 7, so that the description will be omitted (hereinafter, the description may be similarly omitted).

FIG. 9 is a diagram illustrating the journal information table 503. JnlID is an ID for uniquely determining the volume in the storage apparatus, which is used as the journal. RemoteSubsystemID is an ID for uniquely determining the subsystem of the remote (the secondary storage apparatus 2000 of the secondary site S). PairJnlID is an ID for uniquely determining the journal which is paired with the corresponding journal.

FIG. 10 is a diagram illustrating the copy group information table 504. GroupID is an ID for uniquely determining the copy group. Copytype indicates the copy type (RCS, RCA, and RCD). JnlID_P is an ID of the journal which is used for the primary side of the copy pair. JnlID_S is an ID of the journal which is used for the secondary side of the copy pair.

FIG. 11 is a diagram illustrating the pair information table 505. PairID is an ID for uniquely determining the copy pair. PairStatus indicates a data copy status (PAIR: synchronous, COPY: now copying, PSUS: temporary stop, and PSUE: error). LDEVID_P is an ID of the volume used for the primary side of the copy pair. LDEVID_S is an ID of the volume used for the secondary side of the copy pair.

FIG. 12 is a diagram illustrating the copy group performance information table 506. JnlUsage_P indicates the usage rate of the journal used for the primary side of the copy group. JnlUsage_S indicates the usage rate of the journal used for the secondary side of the copy group. SideFileUsage_P indicates the usage rate of the side file used for the primary side of the copy group. SideFileUsage_S indicates the usage rate of the side file used for the secondary side of the copy group.

FIG. 13 is a diagram illustrating the copy group monitoring information table 507. MonitorSetting indicates whether a hard disk power control function is active. JnlUsageMonitor_P indicates a threshold of the journal usage rate used in the primary side of the copy group. JnlUsageMonitor_S indicates the threshold of the journal usage rate used in the secondary side of the copy group.

SideFileUsageMonitor_P indicates the threshold of the side file usage rate used in the primary side of the copy group. SideFileUsageMonitor_S indicates the threshold of the side file usage rate used in the secondary side of the copy group.

Next, an outline of the remote copy process will be described. In the following description, one volume 1070, which is the copy source of the remote copy, is referred to as the primary volume, and another volume 1070, which is the copy destination of the remote copy, is referred to as the secondary volume. It is assumed that the primary storage apparatus 1000 includes the copy source volume, and the secondary storage apparatus 2000 includes the copy destination volume. A group of the copy source volume and the copy destination volume is referred to as the remote copy pair.

When receiving the write request 300 from the host 10000, and when the remote copy pair, whose write target volume is the primary volume, is exists, the primary storage apparatus 1000 starts the remote copying part 1082 to execute the remote copy. The pair information table 505 is used to determine whether remote copy pair, whose write target volume is the primary volume, is exist or not.

Next, a method for using the remote copy will be described. By operating the management client 10 to provide the host 10000 with an instruction, the manager issues an instruction for forming the remote copy pair to the primary storage apparatus 1000. When receiving the instruction for forming the remote copy pair, the primary storage apparatus 1000 copies (initialization-copies) all the data stored in the primary volume to the secondary storage apparatus 2000 to cause data stored in the primary volume and data stored in the secondary volume to be the same as each other.

Further, when receiving the instruction for forming the remote copy pair, the primary storage apparatus 1000 adds a record to the pair information table 5051, which includes a primary volume ID, a secondary volume ID, a pair status, an ID of the other side storage apparatus, and the like. Thereby, hereinafter, when the primary storage apparatus 1000 receives, from the host 10000, the write request 300 to the primary volume of the newly-formed remote copy pair, the remote copying part 1082 is started. That is, by asynchronously transferring the write data 310 of the write request 300 to the secondary volume, it is possible to maintain the data stored in the primary volume and the data stored in the secondary volume to be the same as each other.

When the initialization-copy is completed, the pair status of the remote copy pair becomes the PAIR. When the primary storage apparatus 1000 receives, from the host 10000, the write request 300 for the primary volume of the remote copy pair, whose pair status is the PAIR, the remote copying part 1082 also writes the write data 310 in the secondary volume of the secondary storage apparatus 2000 in asynchronous with the timing when receiving the write request 300.

The PAIR means such a status that the content of the primary volume and the content of the secondary volume are the same as each other as excluding the data which is being transferred from the primary storage apparatus 1000 to the secondary storage apparatus 2000, and the data which is not transferred. However, when a unique identifier for each volume is, for example, stored in the volume, it is assumed that the content of the primary volume and the content of the secondary volume may not be the same as each other in a specific area in the volume, in which such an identifier is stored. Meanwhile, it is assumed that such an identity is referred to as a synchronous status in the after-mentioned description.

Hereinafter, such a method will be roughly described, that writes the write data 310 in asynchronous with the write request 300 from the primary storage apparatus 1000 to the secondary storage apparatus 2000. In a method, which is executed by the remote copying part 1082, for copying the data from the primary volume to the secondary volume, here, by utilizing order information on the write request 300 received by the primary storage apparatus 1000, the secondary storage apparatus 2000 writes the write data 310 in the secondary volume according to such an order.

To make the remote copy part 1082 to operate more efficiently, when a plurality of the write requests 300 are issued to the same address in the primary volume in some term, update information (stored in the control information unit 1090) for all of the issued write requests 300 are not transmitted to the secondary storage apparatus 2000, but only the update information for the last write request 300 issued in such a term may be transmitted to the secondary storage apparatus 2000.

When the primary storage apparatus 1000 and the secondary storage apparatus 2000 include the cache 1040, a pointer is added to the update information, which indicates the storage area on the cache 1040 of the primary storage apparatus 1000 in which the write data 310 is stored, and when the write data 310 on the cache 1040 is updated by another write request 300, the write data 310 may be copied from the cache 1040 to the control information unit 1090 and be added to the update information. That is, the data copy for generating the update information may be delayed until the write data 310 is updated on the cache 1040 of the primary storage apparatus 1000. Thereby, the write data of the update information and the write data on the cache 1040 can be shared.

Next, a suspend instruction of the remote copy pair can be issued from the host 10000 to the primary storage apparatus 1000. This suspend instruction is an instruction for temporarily stopping the data transfer from the primary volume to the secondary volume. The PSUS means a pair status of the remote copy pair in which the data transfer from the primary volume to the secondary volume is temporarily stopped as described above, and the identity between the primary volume and the secondary volume becomes not to be assured.

When the primary storage apparatus 1000 receives the write request 300 for the primary volume of the remote copy pair whose status is the PSUS, the write address 320 in the write request 300 may be recorded in a difference management table stored in the control information unit 1090. That is, the address is recorded, at which the different data is stored in the primary volume and the secondary volume respectively. When the primary volume and the secondary volume are caused to be in the synchronous status again, by utilizing this difference management table, it is possible to copy (differential-copy) only the area in which the different data is stored in the primary volume and the secondary volume respectively. The detailed description will be omitted for this differential-copy.

Figure 14:
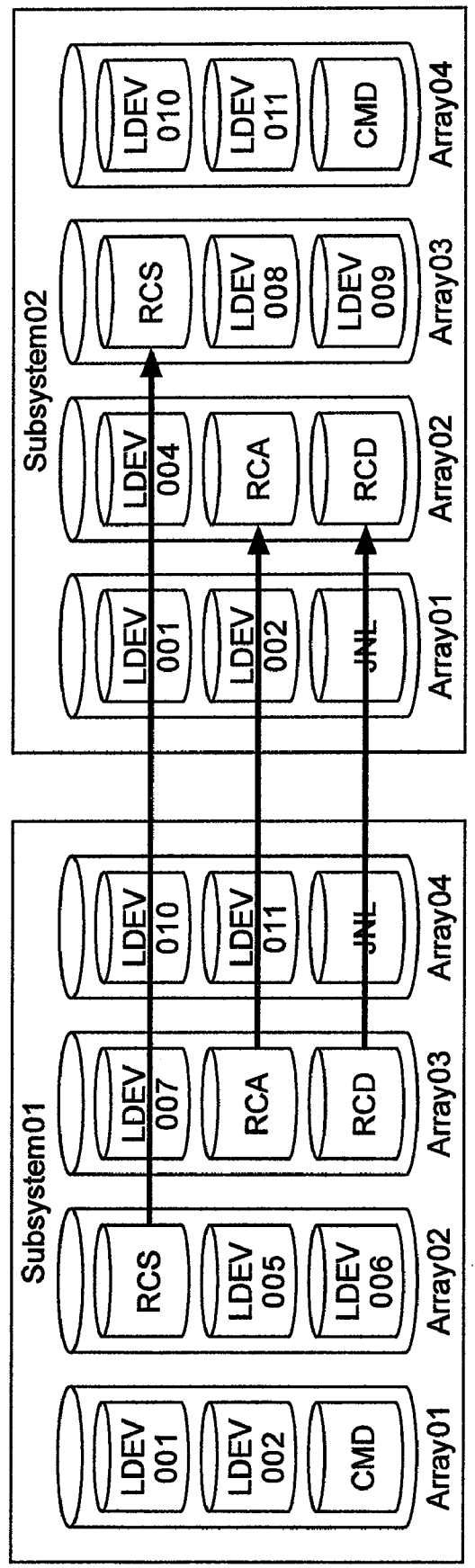
FIG. 14 is a diagram illustrating an initial status of a specific example of the remote copy.

Next, a specific example of the present embodiment will be described. FIG. 14 is a diagram illustrating an initial status of the specific example of the remote copy.

As described above, "CMD" indicates the command device volume, "RCS" indicates the volume of the RCS copy pair, "RCA" indicates the volume of the RCA copy pair, "RCD" indicates the volume of the RCD copy pair, "JNL" indicates the journal volume, and "LDEV0XX" indicates the volume which is not used for the remote copy. In the initial status, it is assumed that each volume is in a status as illustrated in FIG. 14.

<To Present a Recommended Volume to the Manager for Creating Command Device (Function 1)>

FIG. 15 is a diagram for presenting a candidate volume when the command device is created, (a) is a diagram illustrating a case of a comparison example, and (b) is a diagram illustrating a case of the present embodiment.

As illustrated in FIG. 15 (*a*), in a case of the comparison example, the volumes, which are arbitrarily selected from the unused volumes (the volume of "LDEV0XX"), are presented as the candidate volumes (displayed with dash line).

In the present embodiment, the candidate volumes are determined on the following condition.

(Condition 1)

For secondary side, the volumes of the array group which the remote copy volume and the journal are not exist.

As illustrated in FIG. 15 (*b*), in a case of the present embodiment, the volumes which satisfy the condition 1 are presented as the candidate volumes (displayed by dash line).

As described above, in any one of the primary and secondary sides storage apparatuses, it is necessary to constantly start the command device volume while the job is running, so that the disk can not be powered off. Thus, under such a condition, the candidate of the command device volume is presented so that the volume, which needs the constant starting, is caused to preferably belong to the same group, and the manager selects the candidate, thereby, it is possible to increase such an opportunity that the power is turned off for each array group, and to realize the efficient power saving.

In the management server 100, when the recommended volumes is retrieved from the candidate volumes, the volume information table (primary side) 5011, and the volume information table (secondary side) 5012 are used. FIG. 16 is a diagram illustrating the volume information table (primary side) 5011. FIG. 17 is a diagram illustrating the volume information table (secondary side) 5012.

The volume information table (primary side) 5011 is obtained by taking the storage apparatus Subsystem01 information selected by manager from the volume information table 501 and combining it with the command device information table 502, the journal information table 503, the copy group information table 504, and the pair information table 505.

The volume information table (secondary side) 5012 is obtained by taking the storage apparatus Subsystem02 information selected by manager from the volume information table 501 and combining it with the command device information table 502, the journal information table 503, the copy group information table 504, and the pair information table 505. The condition 1 is checked by using such tables.

From the volume information table (primary side) 5011 and the volume information table (secondary side) 5012, it is understood that the secondary side volume or the journal of the remote copy is included in Array 04 of the Subsystem01, and Array 01, Array 02, and Array 03 of the Subsystem02. By using the volume information table (primary side) 5011 and the volume information table (secondary side) 5012, the determination is executed for the volume which does not become the copy pair, the command device, or the journal. This determination is executed by using the ArrayGroupId, the PairID, CopyType, the JnlID, and CmdDevID of the volume information table (primary side) 5011 and the volume information table (secondary side) 5012.

FIG. 18 is a diagram illustrating a determination result for the Subsystem01. FIG. 19 is a diagram illustrating a determination result for the Subsystem02. In the determination result, "◯" indicates the condition satisfaction, "X" indicates the unsatisfied condition (hereinafter, the same as above). As illustrated in FIG. 18, the seven volumes, which satisfy the condition 1, are included in the Subsystem01. As illustrated in FIG. 19, the two volumes, which satisfy the condition 1, are included in the Subsystem02. The manager receives this determination result to select the volume, and it is desirable to select the recommended volume.

Figure 20:
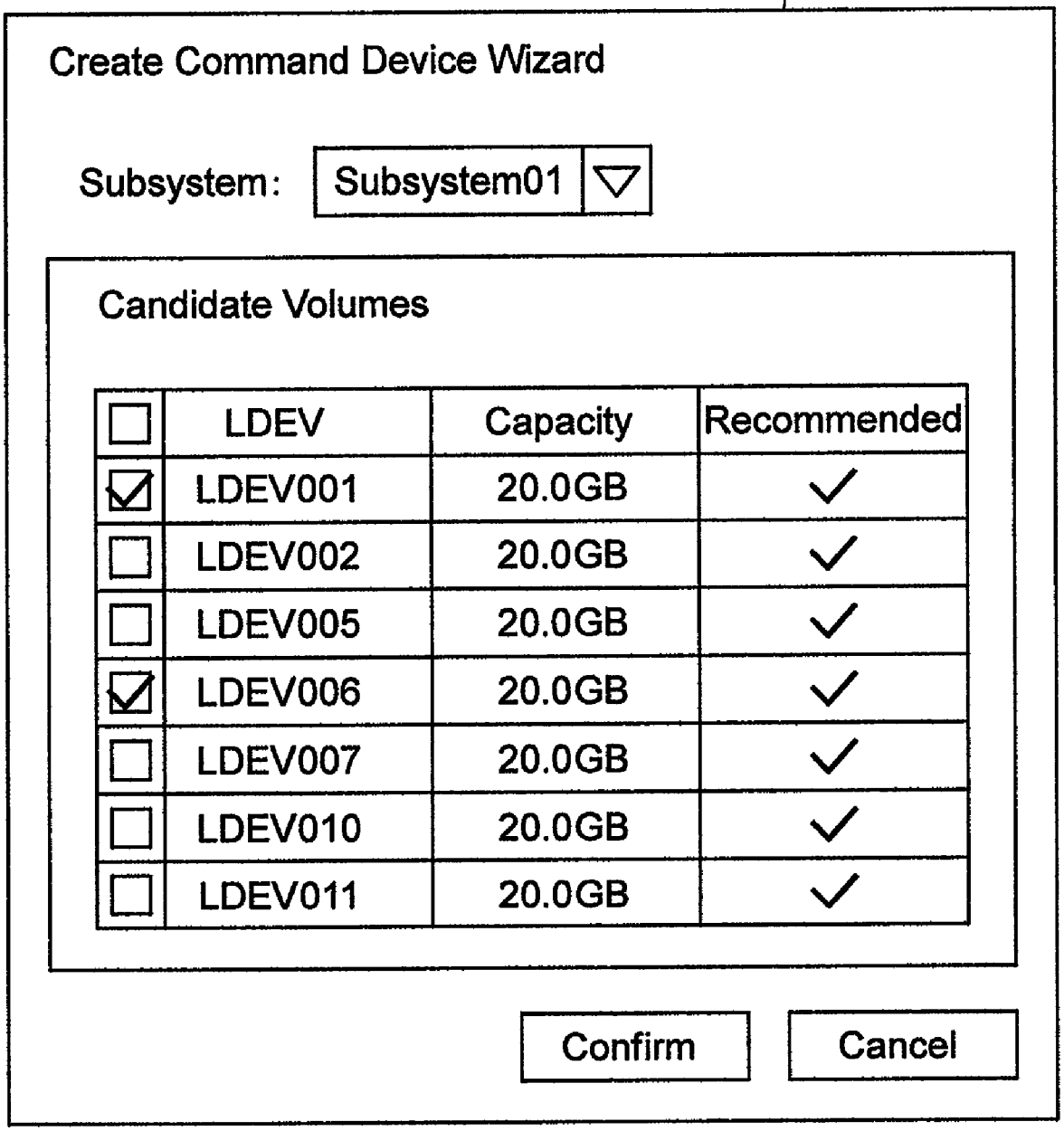
FIG. 20 is a diagram illustrating a screen example when the command device is generated.

FIG. 20 is a diagram illustrating a screen example when the command device is created. This screen is displayed in the Web browser 13 of the management client 10. In this FIG. 20, the screen is illustrated, which displays the determination result for the Subsystem01. When the manager selects the subsystem of the command device to be created, this screen is displayed, which displays the candidate volume of the command device. When the manager selects the volume from the candidate volumes (seven volumes), by clicking the Confirm button, create command device is executed.

Figure 21:
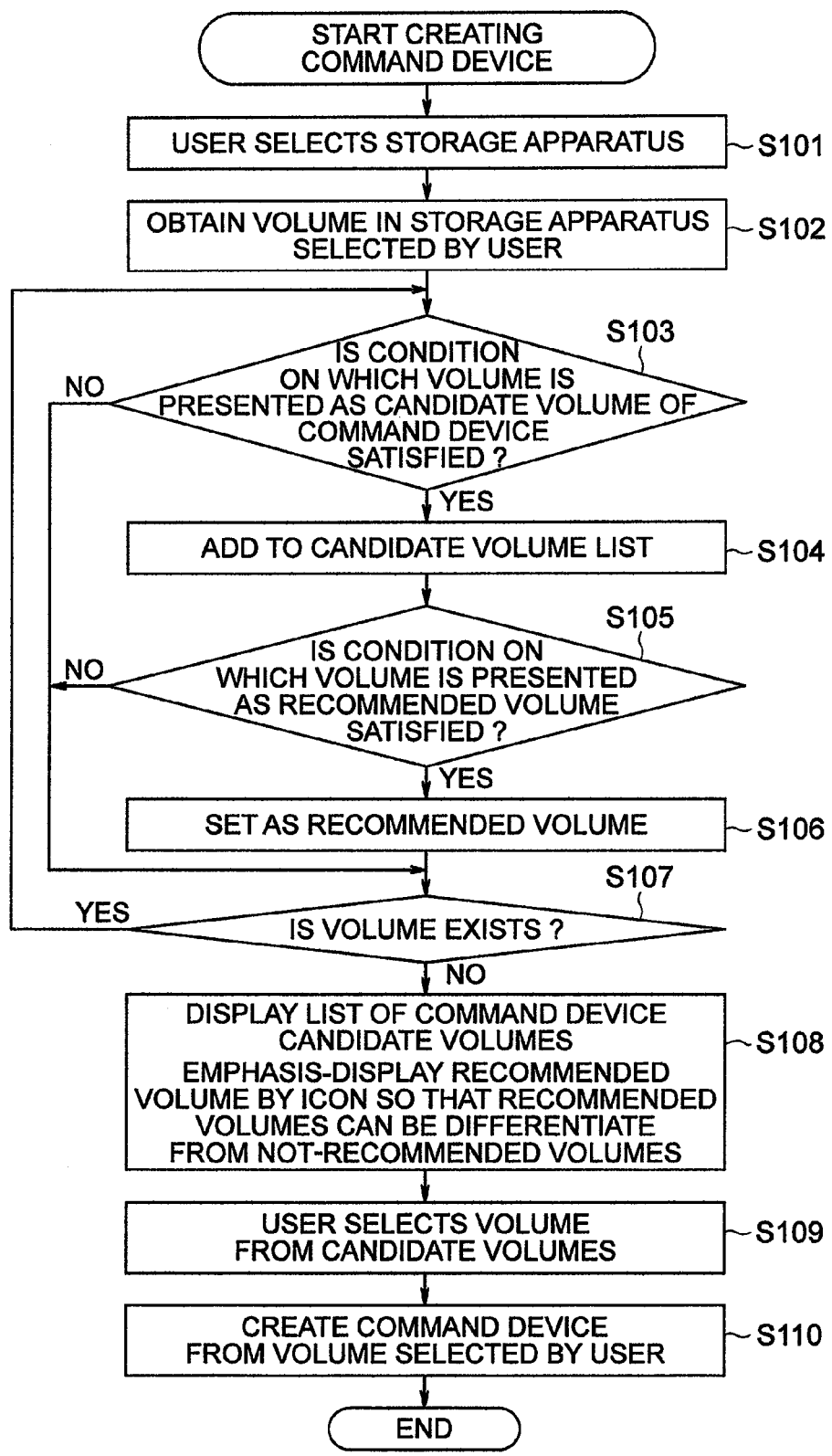
FIG. 21 is a diagram illustrating a process for a function 1 by a management server 100.

FIG. 21 is a diagram illustrating a process for the function 1 by the management server 100. In FIG. 21, when creating the command device, the management server 100 notifies the manager with the command device candidates which satisfy the condition 1 as the recommended volumes. However, when creating the command device, all the candidates may be displayed, from which the command device can be created, and the volume may be also selected from the volume other than the recommended volumes. Meanwhile, an operation main unit of the present process is the CPU 102 of the management server 100, and the tables to be used are the volume information table (primary side) 5011 and the volume information table (secondary side) 5012.

At step S101, the user (manager) designates the storage apparatus, and receives the input of such a storage apparatus.

At step S102, information on the volume of the storage apparatus designated by the user is taken in.

At step S103, it is determined whether or not the condition to present the volume as the candidate volume of the command device is satisfy or not, and when a result of the determination is Yes, the process proceeds to step S104, and when a result of the determination is No, the process proceeds to step S107.

At step S104, the volume which satisfied the condition is added to a candidate volume list.

At step S105, it is determined whether the condition 1 which is to present the volume as recommended volume or not, and when a result of the determination is Yes, the process proceeds to step S106, and when a result of the determination is No, the process proceeds to step S107.

At step S106, the volume which satisfied the condition 1 is set as the recommended volume.

At step S107, it is determined whether the undetermined volume is exist or not, and when a result of the determination is Yes, the process returns to step S103, and when a result of the determination is No, the process proceeds to step S108.

At step S108, the candidate volume list of the command device is displayed in the Web browser 13 of the management client 10. At that time, the recommended volume is emphasis-displayed by an icon so that the recommended volume can be differentiated from the not-recommended volume.

At step S109, the user views the Web browser 13 to select the volume from the candidate volumes, and the input of the selected volume is received.

At step S110, the command device is created from the volume selected by the user.

<To Present the Recommended Volume to the Manager when the Journal is Generated (Function 2)>

FIG. 22 is a diagram for presenting the recommended volume when the journal is generated, (a) is a diagram illustrating a case of a comparison example, and (b) is a diagram illustrating a case of the present embodiment.

As illustrated in FIG. 22 (a), in a case of the comparison example, the volume, which is arbitrarily selected from the unused volume (the volume of "LDEV0XX"), is presented as the candidate volume (displayed by a dash line).

In the present embodiment, the candidate volume is determined on the following conditions. In such a case, for example, first, the volume is retrieved, which satisfies a condition 3, the first priority, and when the corresponding volume is not included, the volume is retrieved, which satisfies a condition 4, the second priority. Such a method may be implemented.

(Condition 3, First Priority)
The volume of the array group in which only the journal is included.
(Condition 4, Second Priority)
The volume of the array group in which the remote copy volume and the command device are not included.

As illustrated in FIG. 22 (b), in a case of the present embodiment, the volume satisfying the condition 3 is presented as the candidate volume (displayed by a dash line).

Under such conditions, the candidate of the journal volume is presented so that the journal volume is caused to preferably belong to the same array group, and the manager selects the candidate, thereby, it is possible to increase such an opportunity that the power is turned off for each array group, and to realize the efficient power saving.

In the management server 100, when the recommended volume is retrieved from the candidate volume, the volume information table (primary side) 5011, and the volume information table (secondary side) 5012 are used.

From the volume information table (primary side) 5011 and the volume information table (secondary side) 5012, it is understood that only the journal is included in the Array 04 of the Subsystem01, and the Array 01 of the Subsystem02. By using the volume information table (primary side) 5011 and the volume information table (secondary side) 5012, the determination is executed for the volume which does not become the copy pair, the command device, or the journal. This determination is executed by using the ArrayGroupId, the PairID, the CopyType, the JnlID, and the CmdDevID of the volume information table (primary side) 5011 and the volume information table (secondary side) 5012.

FIG. 23 is a diagram illustrating the determination result for the Subsystem01. FIG. 24 is a diagram illustrating the determination result for the Subsystem02. As illustrated in FIG. 23, the two volumes are included in the Subsystem01, which satisfies the conditions 3 and 4. As illustrated in FIG. 24, the two volumes are included in the Subsystem02, which satisfies the conditions 3 and 4.

While the manager receives the determination result to select the volume, it is desirable to select the recommended volume. Since the screen on which the journal is generated is the same as the screen of FIG. 20, the illustration and description will be omitted.

Figure 25:
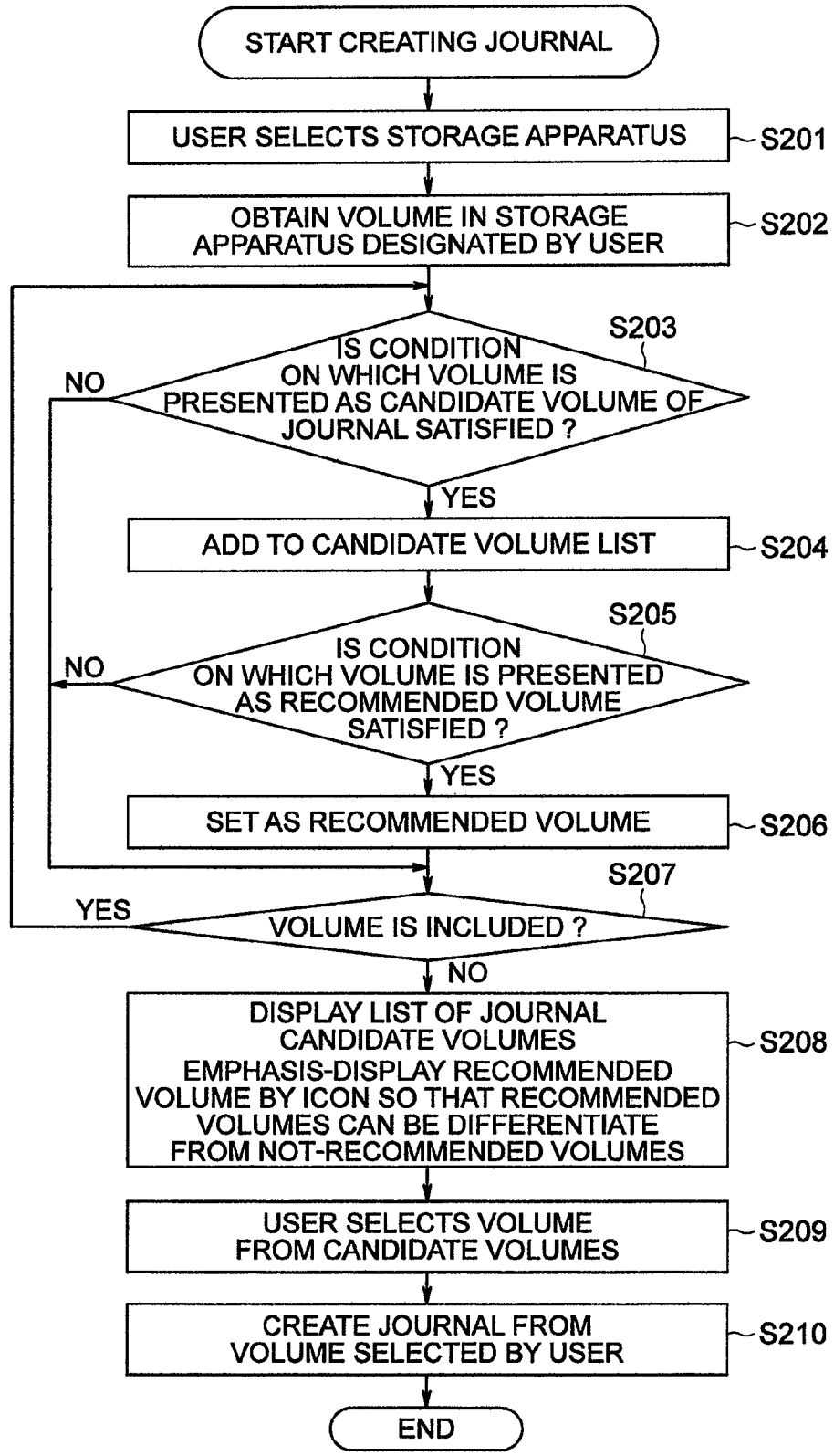
FIG. 25 is a diagram illustrating a process for a function 2 by the management server 100.

FIG. 25 is a diagram illustrating a process for the function 2 by the management server 100. In FIG. 25, when generating the journal, the management server 100 notifies the manager of the candidate of the journal satisfying the conditions 3 and 4 as the recommended volume. However, when generating the journal, all the candidates may be displayed, from which the journal can be generated, and the volume may be also selected from the volume other than the recommended volumes. Meanwhile, the operation main unit of the present process is the CPU 102 of the management server 100, and the tables to be used are the volume information table (primary side) 5011 and the volume information table (secondary side) 5012.

At step S201, the user (manager) designates the storage apparatus to receive the input of such a storage apparatus.

At step S202, information on the volume of the storage apparatus designated by the user is taken in.

At step S203, it is determined whether or not the condition is satisfied on which the volume is presented as the candidate volume of the journal, and when a result of the determination is Yes, the process proceeds to step S204, and when a result of the determination is No, the process proceeds to step S207.

At step S204, the volume satisfying the condition is added to the candidate volume list.

At step S205, it is determined whether or not the conditions 3 and 4 are satisfied on which the volume is presented as the recommended volume, and when a result of the determination is Yes, the process proceeds to step S206, and when a result of the determination is No, the process proceeds to step S207.

At step S206, the volume satisfying the conditions 3 and 4 is set as the recommended volume.

At step S207, it is determined whether or not the undetermined volume is included, and when a result of the determination is Yes, the process returns to step S203, and when a result of the determination is No, the process proceeds to step S208.

At step S208, the candidate volume list of the journal is displayed in the Web browser 13 of the management client 10. At that time, the recommended volume is emphasis-displayed by the icon so that the recommended volume can be distinguished from the not-recommended volume.

At step S209, the user views the Web browser 13 to select the volume from the candidate volumes, and the input of the selected volume is received.

At step S210, the journal is generated from the volume selected by the user.

<To Present the Recommended Volume to the Manager when the Copy Pair is Generated (Function 3)>

FIG. 26 is a diagram for presenting the recommended volume when the copy pair is generated in the synchronous remote copy, (a) is a diagram illustrating a case of a comparison example, and (b) is a diagram illustrating a case of the present embodiment.

As illustrated in FIG. 26 (a), in a case of the comparison example, the volume, which is arbitrarily selected from the unused volume, is presented as the candidate volume (displayed by a dash line).

Figure 27:
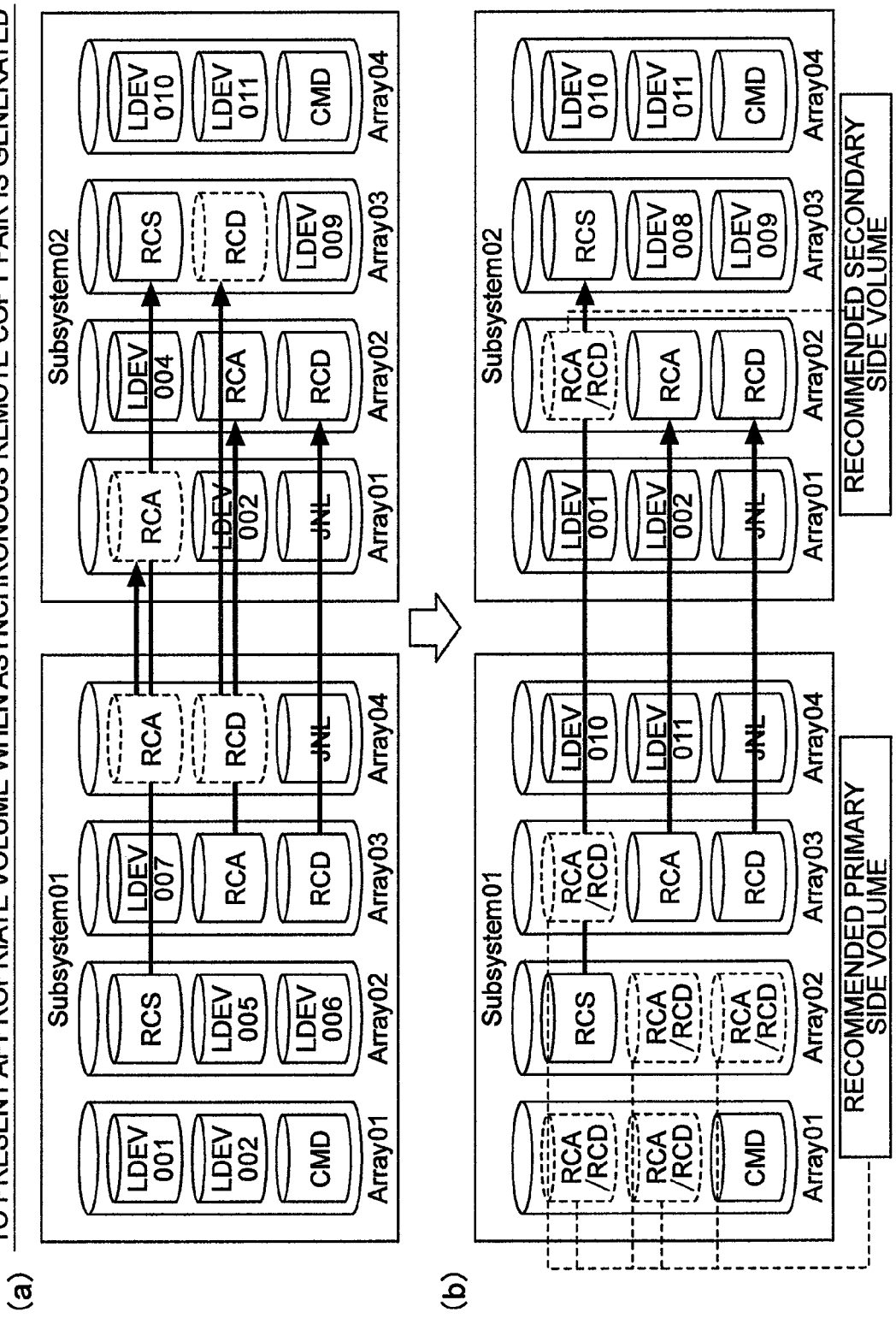
FIG. 27 is a diagram for presenting the recommended volume when the copy pair is generated in an asynchronous remote copy, (a) is a diagram illustrating a case of the comparison example, and (b) is a diagram illustrating a case of the present embodiment.

FIG. 27 is a diagram for presenting the recommended volume when the copy pair is generated in the asynchronous remote copy, (a) is a diagram illustrating a case of a comparison example, and (b) is a diagram illustrating a case of the present embodiment.

As illustrated in FIG. 27 (a), in a case of the comparison example, the volume, which is arbitrarily selected from the unused volume, is presented as the candidate volume (displayed by a dash line).

In the present embodiment, the candidate volume is determined on the following conditions. Conditions 5 and 6 are conditions for the primary side volume of the recommended copy pair. Conditions 7 and 8 are conditions for the secondary side volume of the recommended copy pair in the case of the synchronous remote copy. Conditions 9 and 10 are conditions for the secondary side volume of the recommended copy pair in the case of the asynchronous remote copy.

(Condition 5, First Priority)
The volume of the array group in which the secondary side volume and the journal of the remote copy are not included, and the volume of the array group in which the primary side volume or the journal of the remote copy is included.

(Condition 6, Second Priority)
The volume of the array group in which the secondary side volume and the journal of the remote copy are not included.

(Condition 7, First Priority)
The volume of the array group in which only the secondary side volume of the synchronous remote copy is included.

(Condition 8, Second Priority)
The volume of the array group in which the primary side volume of the synchronous remote copy, and the primary and secondary sides volumes and the journal of the asynchronous remote copy are not included.

(Condition 9, First Priority)
The volume of the array group in which only the secondary side volume of the asynchronous remote copy is included.

(Condition 10, Second Priority)
The volume of the array group in which the primary side volume of the asynchronous remote copy, and the primary and secondary sides volumes and the journal of the synchronous remote copy are not included.

As illustrated in FIG. 26 (b), in a case of the present embodiment, the volume satisfying the condition 5 is presented as the candidate volume (displayed by a dash line). As illustrated in FIG. 27 (b), in a case of the present embodiment, the volume satisfying the condition 7 (9) is presented as the candidate volume (displayed by a dash line).

Under such conditions, the candidate of the volume is presented so that the volume, whose characteristics are the same or similar, is caused to preferably belong to the same group, and the manager selects the candidate, thereby, it is possible to increase such an opportunity that the power is turned off for each array group, and to realize the efficient power saving.

Next, the above will be further described in detail.

"STEP 1" Initial Status

Data is stored in each table of the volume information table 501 to the copy group performance information table 506, and the volume information table (primary side) 5011 and the volume information table (secondary side) 5012 are generated by unifying such tables.

"STEP 2" To Designate the Primary Side Storage Apparatus

When the remote copy pair is generated, the user needs to first select the primary side storage apparatus. Here, it is assumed that the user selects the Subsystem01 as the primary side storage apparatus.

"STEP 3" To Retrieve the Primary Side Recommended Volume

When the user selects the primary side volume of the remote copy pair, the volume is presented so that the recommended volume and the not-recommended volume can be distinguished. When the recommended volume is retrieved from the candidate of the volume, the conditions 5 and 6 are checked by using the volume information table (primary side) 5011.

From the volume information table (primary side) 5011, it is understood that the secondary side volume and the journal of the remote copy are not included in the Array01, the Array02, and the Array03 of the Subsystem01. It can be confirmed that the command device is included in the Array01 of the Subsystem01, and the primary side volume of the remote copy is included in the Array02 and the Array03 of the Subsystem01. By using the volume information table (primary side) 5011, the determination is executed for the volume which does not become the copy pair, the command device, or the journal. This determination is executed by using the ArrayGroupId, the PairID, the CopyType, the JnlID, and the CmdDevID of the volume information table (primary side) 5011.

FIG. 28 is a diagram illustrating the determination result for the Subsystem01. As illustrated in FIG. 28, the five volumes satisfying the conditions 5 and 6 are included in the Subsystem01.

The user receives the determination result to select the volume, and it is desirable to select the recommended volume. Here, it is assumed that the user selects LDEV005 and LDEV007 as the primary side volume.

"STEP 4" To Designate a Copy Type

It is necessary for the user to select the copy type after selecting the primary side storage apparatus. Here, it is assumed that the user designate the synchronous remote copy (RCS) and the asynchronous remote copy (RCA).

"STEP 5" To Designate the Secondary Side Storage Apparatus

It is necessary for the user to select the secondary side storage apparatus after selecting the copy type. Here, it is assumed that the user selects the Subsystem02 as the secondary side storage apparatus.

"STEP 6" To Retrieve the Secondary Side Recommended Volume

When the user selects the secondary side volume of the remote copy pair, the volume is presented so that the recommended volume and the not-recommended volume can be distinguished. When the recommended volume is retrieved from the candidate of the volume, the conditions 7 and 8 (a case of the synchronous remote copy), or the conditions 9 and 10 (a case of the asynchronous remote copy) are checked by using the volume information table (secondary side) 5012.

When the user selects the synchronous remote copy, from the volume information table (secondary side) 5012, it is understood that the primary side volume of the synchronous remote copy, and the primary and secondary sides volumes and the journal and the command device of the asynchronous remote copy are not included in the Array03 of the Subsystem02. By using the volume information table (secondary side) 5012, the determination is executed for the volume which does not become the copy pair, the command device, or the journal. This determination is executed by using the ArrayGroupId, the PairID, the CopyType, the JnlID, and the CmdDevID of the volume information table (secondary side) 5012.

When the user selects the asynchronous remote copy, from the volume information table (secondary side) 5012, it can be confirmed that the primary side volume of the asynchronous remote copy, and the primary and secondary sides volumes and the command device and the journal of the synchronous remote copy are not included in the Array02 of the Subsystem02. By using the volume information table (secondary side) 5012, the determination is executed for the volume which does not become the copy pair, the command device, or the journal. This determination is executed by using the ArrayGroupId, the PairID, the CopyType, the JnlID, and the CmdDevID of the volume information table (secondary side) 5012.

FIG. 29 is a diagram illustrating the determination result for the Subsystem02 in the synchronous remote copy. As illustrated in FIG. 29, the two volumes satisfying the conditions 7 and 8 are included in the Subsystem02.

Figures 30, 31:
FIG. 30 is a diagram illustrating the determination result for the Subsystem02 in the asynchronous remote copy.
FIG. 31 illustrates copy group information 5041 generated by a user.

FIG. 30 is a diagram illustrating the determination result for the Subsystem02 in the asynchronous remote copy. As illustrated in FIG. 30, the one volume satisfying the conditions 9 and 10 is included in the Subsystem02.

The user receives this determination result to select the volume, and it is desirable to select the recommended volume. Here, it is assumed that the user selects LDEV008 (the synchronous remote copy) and LDEV004 (the asynchronous remote copy) as the secondary side volume.

"STEP 7" To Set a Threshold

A threshold of the journal or the side file of the copy pair to be generated this time is set. When the user designates a type of the synchronous remote copy (RCS), it is invalid to set the threshold. When the user designates a type of the asynchronous remote copy (RCA or RCD), it is valid to set the threshold, however, the existence of this setting can be selected by the user, so that it is also possible not to set the threshold. Here, it is assumed that the user sets the valid threshold.

When the type of the designated asynchronous remote copy is the RCA, the threshold of the side file (memory) of the primary and secondary sides of the copy pair is set. When the designated type of the asynchronous remote copy is the RCD, the threshold of the journal (volume) of the primary and secondary sides of the copy pair is set. When the threshold is set, data is inserted to the copy group monitoring information table 507. However, only after it succeeds to generate the copy pair, the data is actually inserted to the copy group monitoring information table 507. The followings are examples of the data to be inserted: copy group information 5041 generated by the user in FIG. 31; copy pair information 5053 generated by the user in FIG. 32; copy group performance information 5061 generated by the user in FIG. 33; and copy group monitoring information 5071 designated by the user in FIG. 34. The disk is powered off according to the inserted threshold. Here, in the copy group performance information 5061 generated by the user, it is assumed that "10" (the threshold of the primary side side file) and "20" (the threshold of the secondary side side file) are set.

The screen, which is used when the manager selects the volume, is the same as the screen of FIG. 20, so that the illustration and the description will be omitted.

Figure 35A:
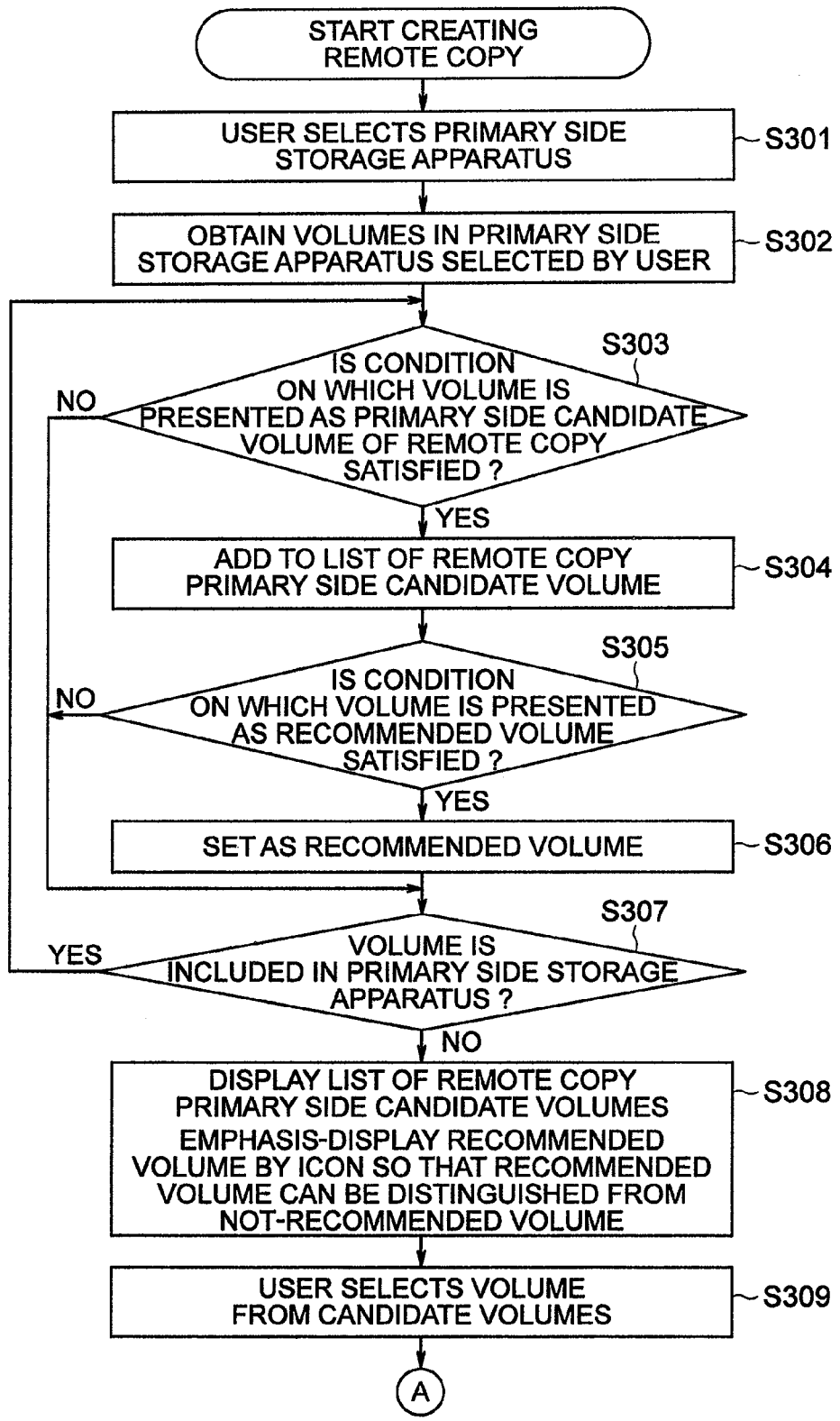
FIG. 35A is a diagram illustrating a process of a function 3 by the management server 100.
Figure 35B:
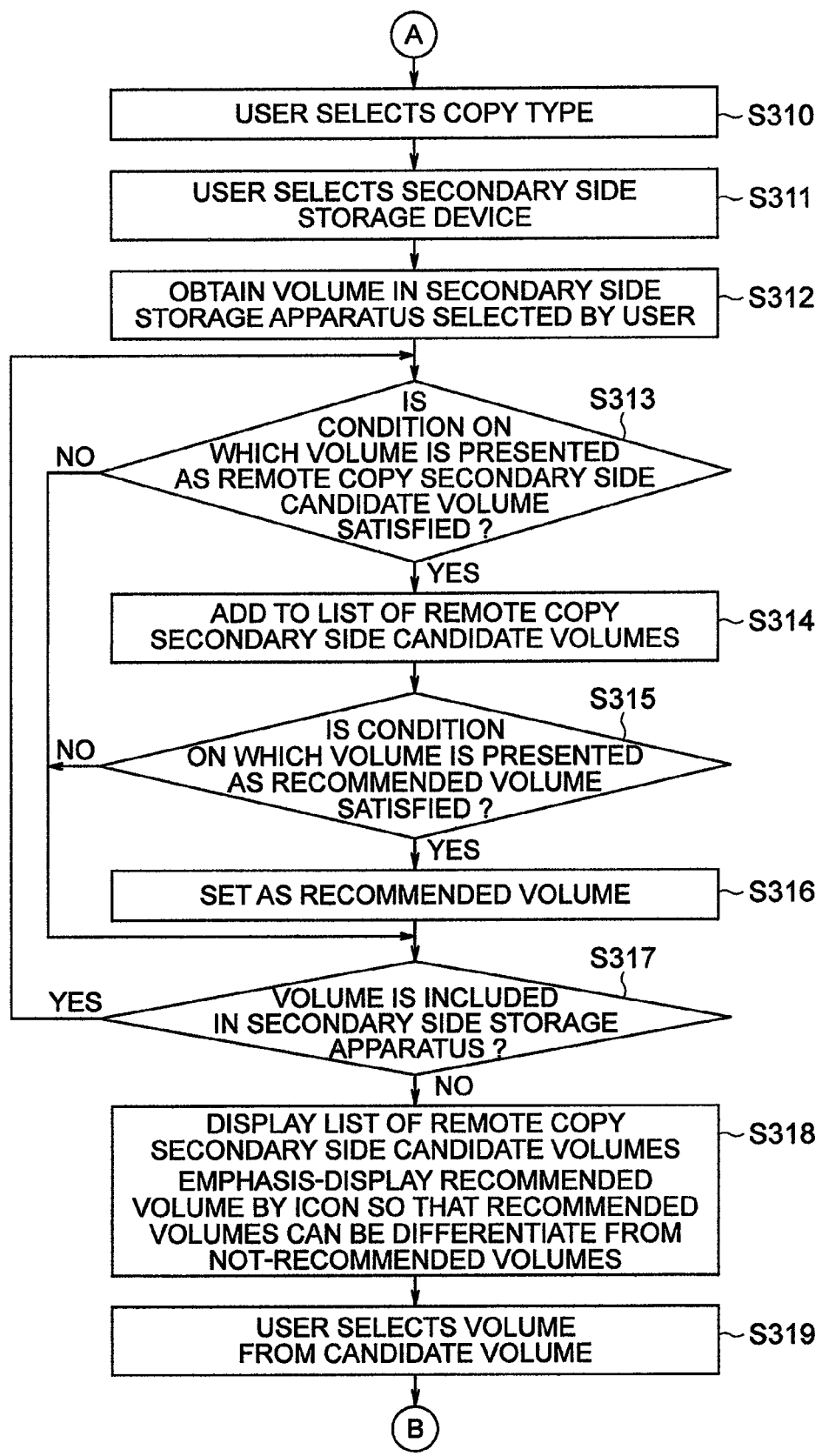
FIG. 35B is a diagram illustrating a process of the function 3 by the management server 100.

FIGS. 35A to 35C are diagrams illustrating a process of the function 3 by the management server 100. In FIGS. 35A to 35C, when generating the remote copy pain, the management server 100 notifies the manager of the candidate of the journal satisfying the conditions 3 and 4 as the recommended volume. However, when generating the remote copy, all the candidates may be displayed, from which the journal can be generated, and the volume may be also selected from the volume other than the recommended volumes. Meanwhile, an operation main unit of the present process is the CPU 102 of the management server 100, and the tables to be used are the volume information table (primary side) 5011 and the volume information table (secondary side) 5012.

At step S301, the user (manager) designates the primary side storage apparatus to receive the input of such a primary side storage apparatus.

At step S302, information on the volume of the primary side storage apparatus designated by the user is taken in.

At step S303, it is determined whether or not the condition is satisfied, on which the volume is presented as the primary side candidate volume of the remote copy, and when a result of the determination is Yes, the process proceeds to step S304, and when a result of the determination is No, the process proceeds to step S307.

At step S304, the volume satisfying the condition is added to a primary side candidate volume list of the remote copy.

At step S305, it is determined whether or not the conditions 5 and 6 are satisfied on which the volume is presented as the recommended volume, and when a result of the determination is Yes, the process proceeds to step S306, and when a result of the determination is No, the process proceeds to step S307.

At step S306, the volume satisfying the conditions 5 and 6 is set as the recommended volume.

At step S307, it is determined whether or not the undetermined volume is included in the primary side storage apparatus, and when a result of the determination is Yes, the process returns to step S303, and when a result of the determination is No, the process proceeds to step S308.

At step S308, the primary side candidate volume list of the remote copy is displayed in the Web browser 13 of the management client 10. At that time, the recommended volume is emphasis-displayed by the icon so that the recommended volume can be distinguished from the not-recommended volume.

At step S309, the user views the Web browser 13 to select the volume from the candidate volumes, and receives the input of the selected volume.

At step S310, the user designates the copy type to receive the input of the copy.

At step S311, the user designates the secondary side storage apparatus to receive the input of the secondary side storage apparatus.

At step S312, information on the secondary side storage apparatus designated by the user is obtained.

At step S313, it is determined whether or not the condition is satisfied on which the volume is presented as the secondary side candidate volume of the remote copy, and when a result of the determination is Yes, the process proceeds to step S314, and when a result of the determination is No, the process proceeds to step S317.

At step S314, the volume satisfying the condition is added to a secondary side candidate volume list of the remote copy.

At step S315, it is determined whether or not the conditions 7 and 8 (or the conditions 9 and 10) are satisfied on which the volume is presented as the recommended volume, and when a result of the determination is Yes, the process proceeds to step S316, and when a result of the determination is No, the process proceeds to step S317.

At step S316, the volume satisfying the conditions 7 and 8 (or the conditions 9 and 10) is set as the recommended volume.

At step S317, it is determined whether or not the undetermined volume is included in the secondary side storage apparatus, and when a result of the determination is Yes, the process returns to step S313, and when a result of the determination is No, the process proceeds to step S318.

At step S318, the secondary side candidate volume list of the remote copy is displayed in the Web browser 13 of the management client 10. At that time, the recommended volume is emphasis-displayed by the icon so that the recommended volume can be distinguished from the not-recommended volume.

At step S319, the user views the Web browser 13 to select the volume from the candidate volumes, and receives the input of the selected volume.

At step S320, it is determined whether or not the designated copy type is the RCS, and when a result of the determination is Yes, the process returns to step S321, and when a result of the determination is No, the process proceeds to step S323.

At step S321, it is determined whether or not the power control for the hard disk is set, and when a result of the determination is Yes, the process returns to step S322, and when a result of the determination is No, the process proceeds to step S331.

At step S322, the power control for the hard disk is set to be active, and the process proceeds to step S331.

At step S323, it is determined whether or not the designated copy type is the RCD, and when a result of the determination is Yes, the process returns to step S327, and when a result of the determination is No, the process proceeds to step S324.

At step S324, it is determined whether or not the power control for the hard disk is set, and when a result of the determination is Yes, the process returns to step S325, and when a result of the determination is No, the process proceeds to step S331.

At step S325, the power control for the hard disk is set to be active, and the process proceeds to step S326. At step S326, the user designates the threshold of the primary and secondary sides side files, the input of the threshold is received, and the process proceeds to step S331.

At step S327, the user designates the primary and secondary sides journals, and the input of the journal is received.

At step S328, it is determined whether or not the power control for the hard disk is set, and when a result of the determination is Yes, the process returns to step S329, and when a result of the determination is No, the process proceeds to step S331.

At step S329, the power control for the hard disk is set to be active, and the process proceeds to step S330. At step S330, the user designates the threshold of the primary and secondary sides journals, the input of the threshold is received, and the process proceeds to step S331.

At step S331, the copy pair is generated from the primary and secondary sides volumes selected by the user.

As described above, according to the information processing system I of the present embodiment, the candidate of the volume is presented so that the volume, whose characteristics are the same or similar, is caused to preferably belong to the same group, and the manager selects the candidate, thereby, it is possible to increase such an opportunity that the power is turned off for each array group, and to realize the efficient power saving.

As an additional device of the present embodiment, it is considered to display the pair status of the RCD and the RCA. According to the present embodiment, by powering on/off the disks corresponding to the secondary journal volume and the secondary volume of the RCD in the remote copy, it is possible to reduce the power consumed by the storage apparatus. On the other hand, the following phenomenon may be induced by powering off the disk corresponding to each volume.

(Power Off of the Secondary Journal Volume)

When the power of the secondary volume is off, the journal (or, the write data written in the primary volume) can not be received from the copy source storage apparatus, so that the write data is increased, which is lost when the fault is induced in the copy source storage apparatus in such a status. In other words, the data of the primary volume, which can be duplicated in the secondary volume of the copy destination storage apparatus, corresponds to the data at the older time than the present time. Meanwhile, when the power of the disk corresponding to the secondary volume is on, the cache memory can be substituted, so that it is not a problem.

(Power Off of the Secondary Volume)

Since the data is accumulated in the secondary journal volume, the time is increased, until the secondary volume becomes to be able to be accessed after the fault is induced in the copy source storage apparatus. This is because the following times become necessary: the time for powering on the disk corresponding to the secondary volume; and the time for writing the journal in the secondary volume.

To respond to such phenomena, in the present embodiment, the copy progress of the RCD and the power on/off status of the volume are displayed in the Web browser 13 of the management client 10. Since the many RCD pairs are included in the remote copy of the storage apparatus, as a displaying method, the status is displayed for each pair, and the status is also displayed for each consistency group.

(1) Information Display for Each Pair

The following statuses are obtained: the power on/off status of the disk corresponding to the secondary volume of the pair to be displayed; and the power on/off status of the disk corresponding to the journal volume belonging to the consistency group to which this pair belongs. The following information is displayed based on the obtained information.

Meanwhile, here, it is assumed that the status of every pair is the PAIR. << >> and < > are statuses, " " is a display content, and (Option display) is displayed with a condition.
<<Secondary volume=ON>>
<Journal=ON>
"PAIR"
<Journal=OFF>
"PAIR, but secondary volume is OFF"
(Option display) "In a cache operation mode"
(Option display) "Journal data transferring is stopped"
<<Secondary volume=OFF>>
<Journal=ON>
"PAIR, but secondary volume is OFF"
(Option display) "Journal reflection is stopped"
(Option display) "Journal reflection is being processed, but journal corresponding to this volume is not included in journal volume (displayed in combination with the executability for the journal reflection of the storage apparatus)" *1
<Journal=OFF>
"PAIR, but journal volume and secondary volume is OFF"
(Option display) "Journal data transmission and journal data reflection are stopped"

Meanwhile, the time after each volume is powered off may be displayed. It is not necessary to power on all the secondary volumes while the journal data is being reflected, and the power may be controlled so that only the secondary volume, in which currently-stored journal is reflected, is powered on. The above *1 is the status corresponding to such an operation.

(2) Information Display for Each Consistency Group

The following statuses are obtained: the power on/off status of all the journal volumes corresponding to the consistency group; and the power on/off status of the secondary volume. The following information is displayed based on the obtained information. << >> and < > are statuses, " " is a display content, and (Option display) is displayed with a condition.
<<Secondary volume=all ON>>
<Journal=ON>
"Group is PAIR"
<Journal=partially OFF>
"Group is PAIR, but secondary journal is partially OFF"
(Option display) "Number or rate of stopped journal volume in group is displayed"
<Journal=all OFF>
"Group is PAIR, but all secondary journals are OFF"
(Option display) "In a cache operation mode" or
"Journal data transferring is stopped"
<<Secondary volume=partially OFF>>
<Journal=ON>
"Group is PAIR, but secondary volume is partially OFF"
(Option display) "Number and rate of OFF volume in group is displayed"
(Option display) "Journal reflection is being processed, but journal corresponding to this volume is not included in journal volume (displayed in combination with the executability for the journal reflection of the storage apparatus)"
<Journal=partially OFF>
"Group is PAIR, but secondary volume is partially OFF, and option display that secondary volume is partially OFF is a combination of the left and above."
<Journal=all OFF>
"Group is PAIR, but all secondary volumes are OFF, and option display that secondary volume is partially OFF is a combination of the left and above."
<<Secondary volume=all OFF>>
<Journal=ON>
"Group is PAIR, but all secondary volumes are OFF, (Option display) "Journal reflection is stopped"
<Journal=partially OFF>
"Group is PAIR, but secondary volume is partially OFF, and option display that all secondary volumes are OFF is a combination of the left and above."
<Journal=all OFF>
"PAIR, but all journal volumes and secondary volume are OFF"
(Option display) "Journal data transmission and journal data reflection are stopped"

As described above, even when many pairs are included, by displaying the status in consideration of the power control for the copy pair, such as pair information, transmission information, reflection information, power on/off information, the manager can understand the copy progress while confirming the on/off status of the disk power.

While the embodiment will be completed by the above description, an aspect of the present invention is not limited to the above description. For example, the screen for displaying the candidate volume may be displayed not only in the Web browser 13 of the management client 10, but also, in a displaying apparatus in the management server 100, and in another displaying apparatus through the Internet. In addition to that the candidate volume is displayed on the screen, the volume may be automatically determined on a predetermined condition from the candidate volume.

Power on/off information for each array group may be reserved in the volume information table 501

The above conditions 1, and 3 to 10 are exemplified, and such any other condition may be adopted on that the volumes, whose power control characteristics are the same or similar, are collected in the same array group.

In the remote copy, the primary and secondary storage apparatuses may be inverted, so that the candidate volume may be selected and displayed in consideration of such a case. In such a case, for example, the AND (logical multiplication) of the conditions may be used in which the primary and secondary storage apparatuses are substituted to each other. As an example, in step S313 of the flowchart of FIG. 35B, it is enough to add only such a condition that the primary volume and the secondary volume are roughly the same in the capacity. Meanwhile, if the inversion of the primary and secondary storage apparatus is not considered, even when the primary volume and the secondary volume are not roughly the same in the capacity, it is enough that the capacity of the secondary volume is larger.

In the present embodiment, while the candidate volume is selected from the existing volume, this operation can be also applied to such a case that the volume is newly generated.

An actual configuration such as hardware and a program can be arbitrarily changed without departing from the concept of the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing system, comprising:
an information processing apparatus;
a first storage apparatus coupled to the information processing apparatus, the first storage apparatus having a plurality of array groups including a plurality of volumes;

a second storage apparatus coupled to the first storage apparatus, the second storage apparatus having a plurality of array groups including a plurality of volumes; and a management apparatus which manages a remote copy executed from a volume in the first storage apparatus to a volume in the second storage apparatus, wherein the management apparatus extracts a candidate volume and displays the extracted candidate volume on the screen so that the volumes having same or similar power control characteristics are collected in the same array group when any one of the volumes in the first storage apparatus and the second storage apparatus is newly used for the remote copy.

2. The information processing system according to claim 1, wherein the remote copy is an asynchronous remote copy, in which a journal volume for temporarily storing data is used.

3. The information processing system according to claim 2, wherein the management apparatus extracts, as the candidate volume, an unused volume in the array group which does not include the volume used as the volume other than the journal volume when extracting the candidate volume for the journal volume.

4. The information processing system according to claim 3, wherein the management apparatus screen-displays a copy progress status and a power on/off status of each volume for a copy pair which is a pair of the volume in the asynchronous remote copy, and a consistency group which is a group for maintaining the consistency of time sequence for the copy pair.

5. A controlling method in an information processing system, wherein the information processing system includes:

an information processing apparatus;

a first storage apparatus coupled to the information processing apparatus, the first storage apparatus having a plurality of array groups including a plurality of volumes;

a second storage apparatus coupled to the first storage apparatus, the second storage apparatus having a plurality of array groups including a plurality of volumes; and a management apparatus which manages a remote copy executed from a volume in the first storage apparatus to a volume in the second storage apparatus, said method comprising the steps of:

extracting a candidate volume; and displaying the extracted candidate volume on the screen so that the volumes having same or similar power control characteristics are collected in the same array group when any one of the volumes in the first storage apparatus and the second storage apparatus is newly used for the remote copy.

6. The controlling method in the information processing system according to claim 5, wherein the remote copy is an asynchronous remote copy, in which a journal volume for temporarily storing data is used.

7. The controlling method in the information processing system according to claim 6, wherein the management apparatus extracts, as the candidate volume, an unused volume in the array group which does not include the volume used as the volume other than the journal volume when extracting the candidate volume for the journal volume.

8. The controlling method in the information processing system according to claim 7, wherein the management apparatus screen-displays a copy progress status and a power on/off status of each volume for a copy pair which is a pair of the volume in the asynchronous remote copy, and a consistency group which is a group for maintaining the consistency of time sequence for the copy pair.

9. A management apparatus in an information processing system, wherein the information processing system includes:

an information processing apparatus;

a first storage apparatus coupled to the information processing apparatus, the first storage apparatus having a plurality of array groups including a plurality of volumes;

a second storage apparatus coupled to the first storage apparatus, the second storage apparatus having a plurality of array groups including a plurality of volumes; and the management apparatus, said management apparatus comprising a unit which manages a remote copy executed from a volume in the first storage apparatus to a volume in the second storage apparatus, wherein the management apparatus extracts a candidate volume and display the extracted candidate volume on the screen so that the volumes having same or similar power control characteristics are collected in the same array group when any one of the volumes in the first storage apparatus and the second storage apparatus is newly used for the remote copy.

10. The management apparatus according to claim 9, wherein the remote copy is an asynchronous remote copy, in which a journal volume for temporarily storing data is used.

11. The management apparatus according to claim 10, wherein the management apparatus extracts, as the candidate volume, an unused volume in the array group which does not include the volume used as the volume other than the journal volume when extracting the candidate volume for the journal volume.

12. The management apparatus according to claim 11, wherein the management apparatus screen-displays a copy progress status and a power on/off status of each volume for a copy pair which is a pair of the volume in the asynchronous remote copy, and a consistency group which is a group for maintaining the consistency of time sequence for the copy pair.

* * * * *